(12) United States Patent
Jackson

(10) Patent No.: US 8,926,858 B2
(45) Date of Patent: Jan. 6, 2015

(54) METHOD OF FORMING CRYOGENIC FLUID COMPOSITION

(75) Inventor: David P. Jackson, Saugus, CA (US)

(73) Assignee: Cool Clean Technologies, LLC, Eagan, MN (US)

( * ) Notice: Subject to any disclaimer, the term of this patent is extended or adjusted under 35 U.S.C. 154(b) by 639 days.

(21) Appl. No.: 13/103,852

(22) Filed: May 9, 2011

(65) Prior Publication Data

US 2011/0233456 A1  Sep. 29, 2011

Related U.S. Application Data

(62) Division of application No. 11/301,466, filed on Dec. 13, 2005, now abandoned.

(60) Provisional application No. 60/635,399, filed on Dec. 13, 2004.

(51) Int. Cl.
 *C09K 5/00* (2006.01)
 *B23Q 11/10* (2006.01)
 *C09K 5/04* (2006.01)

(52) U.S. Cl.
 CPC ............ *B23Q 11/1053* (2013.01); *C09K 5/041* (2013.01)
 USPC .......................................................... 252/71

(58) Field of Classification Search
 USPC .......................................................... 252/71
 See application file for complete search history.

(56) References Cited

U.S. PATENT DOCUMENTS

| | | |
|---|---|---|
| 3,734,412 A | 5/1973 | Haas et al. |
| 3,971,114 A | 7/1976 | Dudley |
| 4,389,820 A | 6/1983 | Fong et al. |
| 4,829,859 A | 5/1989 | Yankoff |
| 5,129,190 A | 7/1992 | Kovach et al. |
| 5,203,794 A | 4/1993 | Stratford et al. |
| 5,306,350 A * | 4/1994 | Hoy et al. ............... 134/22.14 |
| 5,364,474 A | 11/1994 | Williford, Jr. |
| 5,385,655 A | 1/1995 | Brent |
| 5,509,335 A | 4/1996 | Emerson |
| 5,558,110 A | 9/1996 | Williford, Jr. |
| 5,592,863 A | 1/1997 | Jaskowiak et al. |
| 5,725,154 A | 3/1998 | Jackson |

(Continued)

OTHER PUBLICATIONS

Autret, Ronan et al., Minimum Quantity Lubrication in Finish Hard Turning, HNICEM 2003, Mar. 2003, Woodruff School of Mec. Eng.

(Continued)

*Primary Examiner* — Ling Choi
*Assistant Examiner* — Thuy-Ai Nguyen
(74) *Attorney, Agent, or Firm* — DuFault Law Firm, P.C.; Dustin R. DuFault

(57) ABSTRACT

A method of forming a machining spray for treating a surface of a substrate during a machining process includes providing a first component containing solid carbon dioxide particles. A second provided component is derived from an inert gas having a temperature range from 305 K to about 477 K prior to being mixed with the solid carbon dioxide particles. The first component and the second component are combined to form the cryogenic fluid composition prior to contacting the substrate. An optional additive may be mixed with the solid carbon dioxide particles or the inert gas. The cryogenic fluid composition exhibits synergistically enhanced physico-chemical properties of each component not observed prior to the combination thereof, wherein the fluid imparts enhanced cooling, heating or lubrication effects.

18 Claims, 15 Drawing Sheets

(56) References Cited

U.S. PATENT DOCUMENTS

| | | |
|---|---|---|
| 5,766,061 A | 6/1998 | Bowers |
| 5,775,127 A | 7/1998 | Zito |
| 5,853,128 A | 12/1998 | Bowen et al. |
| 5,901,623 A | 5/1999 | Hong |
| 5,931,721 A * | 8/1999 | Rose et al. .................. 451/89 |
| 5,961,041 A | 10/1999 | Sekihara et al. |
| 6,036,581 A | 3/2000 | Aoki |
| 6,066,032 A | 5/2000 | Borden et al. |
| 6,116,049 A * | 9/2000 | Filipczak ..................... 62/603 |
| 6,203,406 B1 | 3/2001 | Rose et al. |
| 6,578,369 B2 * | 6/2003 | Kunkel et al. ................ 62/64 |
| 6,875,286 B2 * | 4/2005 | Cotte et al. ................... 134/7 |
| 2003/0188763 A1 | 10/2003 | Banerjee et al. |
| 2003/0207655 A1 * | 11/2003 | Jackson ....................... 451/38 |
| 2003/0220218 A1 | 11/2003 | Fitzgerald |
| 2004/0003831 A1 | 1/2004 | Mount |
| 2004/0055624 A1 | 3/2004 | McDermott et al. |
| 2004/0200774 A1 | 10/2004 | Shekunov et al. |
| 2004/0224865 A1 | 11/2004 | Roeder et al. |
| 2004/0234350 A1 | 11/2004 | Jager et al. |
| 2005/0029492 A1 | 2/2005 | Subawalla et al. |
| 2005/0058836 A1 | 3/2005 | Goldstein |
| 2005/0181613 A1 | 8/2005 | Xu et al. |

OTHER PUBLICATIONS

Kubie, Lawrence S., The Solubility of O2, CO2 and N2 in Mineral Oil and the Transfer of Carbon Dioxide From Oil to Air, Journal of Biological Chemistry, Apr. 1927, V72, 545-548.

Williford, John F., Substitution of Liquid Carbon Dioxide for Chloroflurocarbon, Jul. 30, 1993, National Science Foundation.

Williford, John F., Substitution of CO2 Aerosols for CFC-113 in Cleaning Precision Surfaces & Microelectronics, Sep. 9, 1992, Dept. of Defense.

Godfrey, Douglas et al., Physical and Chemical Properties in Mineral Oils That Affect Lubrication, 1995, Herguth Laboratories, Inc.

Wang, Z.Y. et al., Cryogenic Machining of Tantalum, Jan. 2002, Journal of Manufacturing Processes, 2002, Societ. of Manufacturing Engineers.

Hobbie, M. et al., Disintegration of Liquid Phases in Pressurized Gases—Influence of Mass Transfer, Sep. 2002, Tech. Univ. Hamburg, Germany.

* cited by examiner

Fc:Fd:Fa = 60:30:10

Fc:Fd:Fa = 30:70:0

Fc:Fd:Fa = 18:80:2

Fc:Fd:Fa = 0:95:5
Fc:Fd:Fa = 0:100:0

METHOD OF FORMING CRYOGENIC FLUID COMPOSITION

CROSS-REFERENCE TO RELATED APPLICATION(S)

This application is a divisional of U.S. patent application Ser. No. 11/301,466 filed on 13 Dec. 2005, which claimed the benefit U.S. Provisional Patent Application No. 60/635,399 filed on 13 Dec. 2004, each of which are hereby incorporated herein by reference.

BACKGROUND OF INVENTION

The present invention generally relates to machining processes. More specifically, the present invention relates to machining processes requiring selective thermal control and/or lubrication during lathe machining, board cutting, wafer singulation and active electronic component thermal cycling. The present invention may be used as a metalworking and machining fluid for operations such as turning, milling, facing, threading, boring and grooving, and more particularly, to a method and apparatus for performing such metal working operations at high speeds with extended insert life, and more particularly as a direct replacement for flooded coolant/lubricant systems or conventional liquid cryogenic sprays.

Most machining operations are performed by a cutting tool which includes a holder and one or more cutting inserts each having a surface terminating with one or more cutting edges. The tool holder is formed with a socket within which the cutting inserts are clamped in place. The cutting edge of the insert contacts the workpiece to remove material therefrom, typically in the form of chips. A chip comprises a plurality of thin, generally rectangular-shaped sections of material which slide relative to one another along shear planes as they are separated by the insert from the workpiece. This shearing movement of the thin sections of material relative to one another in forming a chip generates a substantial amount of heat, which, when combined with the heat produced by engagement of the cutting edge of the insert with the workpiece, can amount to 1500 degrees F. to 2000 degrees F.

Among the causes of failure of the cutting inserts of tool holders employed in prior art machining operations are abrasion between the cutting insert and workpiece, and a problem known as cratering. Cratering results from the intense heat developed in the formation of the chips and the frictional engagement of the chips with the cutting insert. As the material forming the chip is sheared from the workpiece, it moves along at least a portion of the exposed top surface of the insert. Due to such frictional engagement, and the intense heat generate in the formation of the chip material along the top portion of the insert is removed forming "craters". If these craters become deep enough, the entire insert is subject to cracking and failure along its cutting edge, and along the sides of the insert, upon contact with the workpiece. Cratering has become a particular problem in recent years due to the development and extensive use of hard alloy steels, high strength plastics and composite materials formed of high tensile strength fibers coated with a rigid matrix material such as epoxy.

Attempts to avoid cratering and wear of the insert due to abrasion with the workpiece have provided only modest increases in tool life and efficiency. One method has been to form inserts of high strength materials such as tungsten carbide. However, while extremely hard, tungsten carbide inserts are brittle and are subject to chipping which results in premature failure. To improve the lubricity of inserts, such materials as hardened or alloyed ceramics have been employed in the fabrication of cutting inserts. Additionally, a variety of low friction coatings have been developed for cutting inserts to reduce the friction between the cutting insert and workpiece. Additionally, attempts have been made to increase tool life by reducing the temperature in the cutting zone, or the area about cutting edge of the insert, the insert-workpiece interface and the area on the workpiece where material is sheared to form chips.

One method of cooling practiced in the prior art is flood cooling which involves the spraying of a low pressure stream of coolant toward the cutting zone. Typically, a nozzle disposed several inches above the cutting tool and workpiece directs a low pressure stream of coolant toward the workpiece, tool holder, cutting insert and on top of the chips being produced. The primary problem with flood cooling is that it is ineffective in actually reaching the cutting area. The underside of the chip which makes contact with the exposed top surface of the cutting insert, the cutting edge of the insert and the area where material is sheared from the workpiece, are not cooled by the low pressure stream of coolant directed from above the tool holder and onto the top surface of the chips. This is because the heat in the cutting zone is so intense that a heat barrier is produced which vaporizes the coolant well before it can flow near the cutting edge of the insert.

Several attempts have been made in the prior art to improve upon the flood cooling technique described above. For example, the discharge orifice of the nozzle carrying the coolant was placed closer to the insert and workpiece, or fabricated as an integral portion of the tool holder, to eject the coolant more directly at the cutting area. In addition to positioning the nozzle nearer to the insert and workpiece, the stream of coolant was ejected at higher pressures than typical flood cooling applications in an effort to break through the heat barrier developed in the cutting area.

Other tool holders for various types of cutting operations have been designed to incorporate coolant delivery passageways which direct the coolant flow across the exposed top surface of the insert toward the cutting edge in contact with the workpiece. In such designs, a separate conduit or nozzle for spraying the coolant toward the cutting area was eliminated making the cutting tool more compact. Finally, machine tools of cutting operations have been designed to incorporate cryogenic coolant delivery through machine tool passageways which direct the coolant flow across the exposed top surface of the insert toward the cutting edge in contact with the workpiece or spray cryogenic fluid such as liquid carbon dioxide and liquid nitrogen, and cryogenic mixtures containing water, directly onto the workpiece to cool and remove chips.

Again, the problem with the aforementioned apparatuses is that coolant in the form of an oil-water or synthetic mixture, at ambient temperature, is directed across the top surface of the insert toward the cutting area without sufficient velocity to pierce the heat barrier surrounding the cutting area. As a result, the coolant fails to reach the boundary layer or interface between the cutting insert and workpiece and/or the area on the workpiece where the chips are being formed before becoming vaporized. Under these circumstances, heat is not dissipated from the cutting area which causes cratering. In addition, this failure to remove heat from the cutting area creates a significant temperature differential between the cutting edge of the insert which remains hot, and the rear portion of the insert cooled by coolant, causing thermal failure of the insert.

Another serious problem in present day machining operations involves the breakage and removal of chips from the area of the cutting insert, tool holder and the chucks which mount the workpiece and tool holder. If chips are formed in continuous lengths, they tend to wrap around the tool holder or chucks which almost always leads to tool failure or at least requires periodic interruption of the machining operation to clear the work area of impacted or bundled chips. This is particularly disadvantageous in flexible manufacturing systems in which the entire machining operation is intended to be completely automated. Flexible manufacturing systems are designed to operate without human assistance and it substantially limits their efficiency if a worker must regularly clear impacted or bundled chips.

Moreover, environmental health and work safety issues are becoming a major concern. It has been estimated that between 700,000 and one million workers are exposed to cutting fluids in the United States. Since cutting fluids are complex in composition, they may be more toxic than their components and may be an irritant or allergenic even if the raw materials are safe. Also, both bacteria and fungi can effectively colonize the cutting fluids and serve as source of microbial toxins. Significant negative effects, in terms of environmental, health, and safety consequences, are associated with use of the cutting fluids.

In an attempt to address some of these issues, the use of oil-water microemulsions has become widespread. The purpose of the emulsion in metal working is to provide maximum cooling with water and at the same time have the oil impart some lubricating properties so that friction between the moving chip and the contact surface of any cutting tool is reduced. However, as a result, the part being machined has a working surface that contains an inorganic contaminant, water, and an organic contaminant, oil. This makes the post-cleaning process much more complicated.

Typically, a solvent cleaning operation is performed in-between or following final processing, which necessitates removal from the manufacturing tool for such operations. For example, a conventional strategy is to remove a machined article from a machining center and using an alcohol to remove the water and an organic solvent to remove the oil. Another conventional post-cleaning operation involves the use of newer organic solvents such as n-propyl bromide (nPB). However, solvents such as nPB are expensive and pose airborne toxicity issues themselves to exposed workers. Moreover, reclamation systems and other associated costs of using organic cleaning solvents such as nPB are prohibitively high.

The use of water-based cleaners and water rinsing is still another method of post-cleaning common in the metalworking industry. Although generally cheaper and safer to use with respect to organic solvents, these agents themselves become polluted with heavy metals and other contaminants and must be treated prior to disposal.

Another deficiency in the prior art is in regard to the use of dry-cold cryogenic sprays to provide selective mechanical force and cooling within a cutting zone of a laser machining operation. Although conventional methods of applying cryogenic sprays to a substrate during machining processes, such as spraying liquid carbon dioxide directly onto the machined substrate to form a cold gas-solid aerosol, may be similarly applied to a laser machining surface, these methods and chemistries suffer from several disadvantages. For example, conventional cryogenic sprays can be used to eliminate laser machining heat and debris, however, because the spray temperature can not be controlled by these conventional processes, significant amounts of atmospheric water vapor is condensed as liquid and solid water in and around the laser cutting zone during the machining operation. Liquid and solid water present on a cutting surface absorb or reflect strongly in ultra-violet and infra-red spectral regions, which interferes with lasing power and beam delivery onto the substrate surface, thus producing cut quality problems. Another limitation is that the spray pressures cannot be controlled effectively to balance laser cutting efficiency with fluid force, temperature and pressure.

BRIEF SUMMARY OF INVENTION

The present invention includes a cryogenic composite fluid for use as a coolant, lubricant, carrier agent and any combination thereof. The present invention may be used to formulate a machining spray composition which exhibits a specific cooling capacity, lubricity, spray pressure and temperature, density, viscosity, and other beneficial physicochemical properties for a particular machining requirement. The cryogenic composite fluid preferably comprises a coolant phase, a diluent phase and an optional additive phase. The coolant phase preferably includes sublimable carbon dioxide snow which acts as a lubricant, carrier agent and heat extraction agent. The diluent phase is preferably derived from a variety of organic and inorganic liquids, solids, and gases that serve as the physical propulsion and carrier fluid which selectively delivers solid coolant and additive agents into a cutting zone, a dilution agent which selectively dilutes the effects of the other compositional ingredients and as a temperature regulation agent. The additive phase comprises any variety or mixture of organic liquids, organic gases and solids that selectively modify the coolant and diluent phases and provide coolant and lubricant enhancements such as viscosity adjustment, changes to film consistency, corrosion inhibition and modification of lubricity.

Numerous single component, binary or ternary coolant-lubricant spray compositions may be derived exhibiting varying physicochemical characteristics such as wetness, dryness, coolness, hotness, pressure, flowrate, lubricity, surface tension, mass, spray film consistency and density. The cryogenic fluid of the present invention can be applied to machining or treatment processes that require selective cleaning, cooling, lubricating or abrasion, including laser machining or treatment operations. The cryogenic fluid composition of the present invention is capable of sweeping away dirt, grime, oils and chips while simultaneously providing cooling and lubrication.

DETAILED DESCRIPTION

Figure 1:
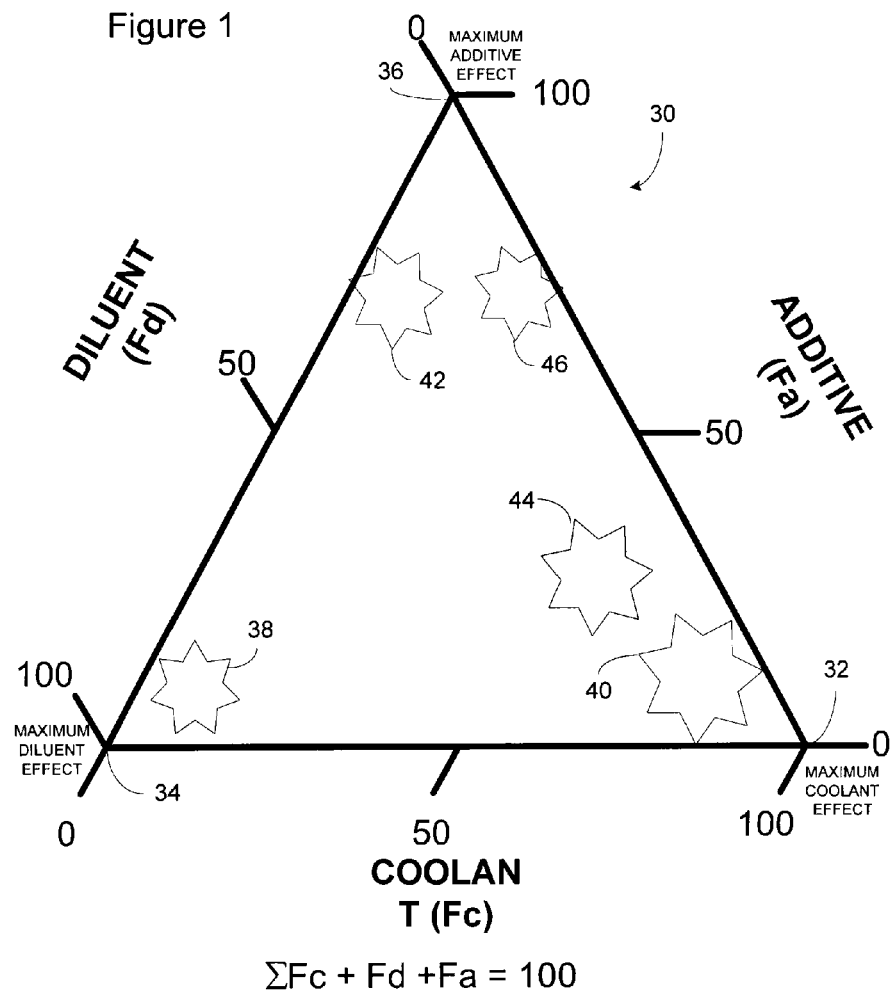
FIG. 1 is a diagram illustrating phase components of a cryogenic spray of the present invention.
Figure 2:
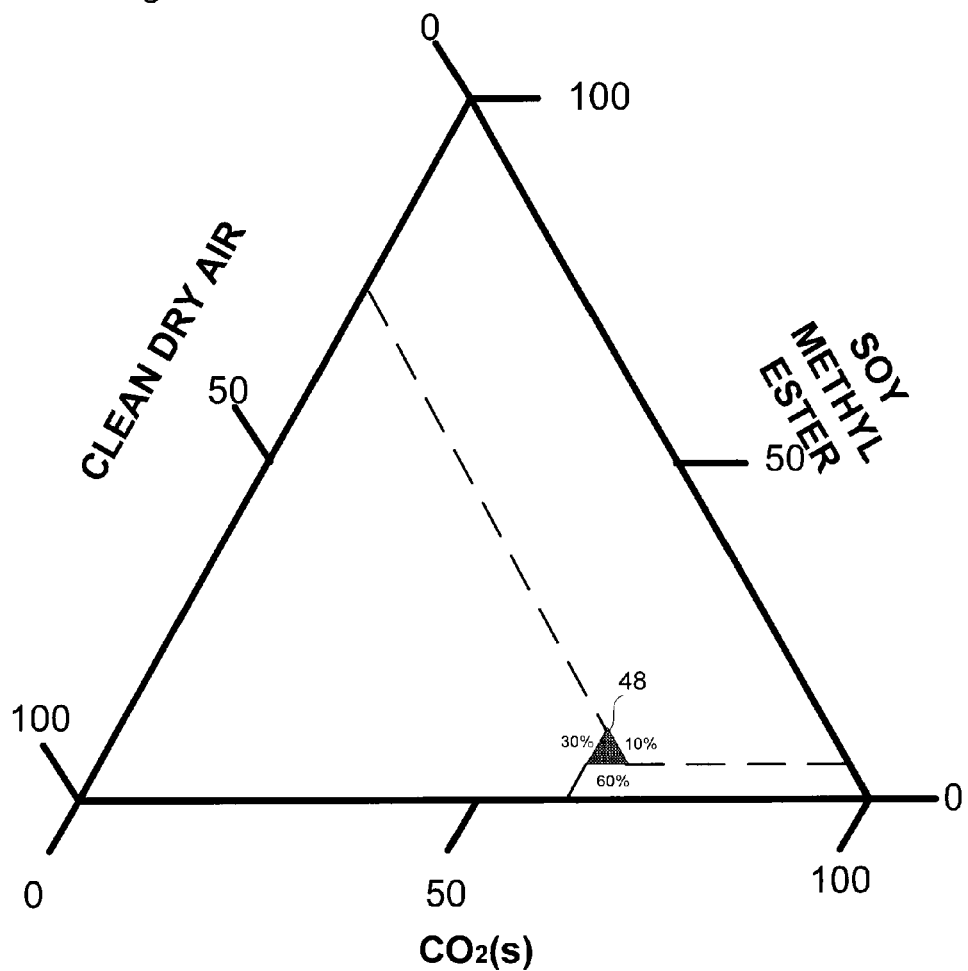
FIG. 2 is a diagram illustrating phase components of a selected cryogenic spray of the present invention.
Figure 3:
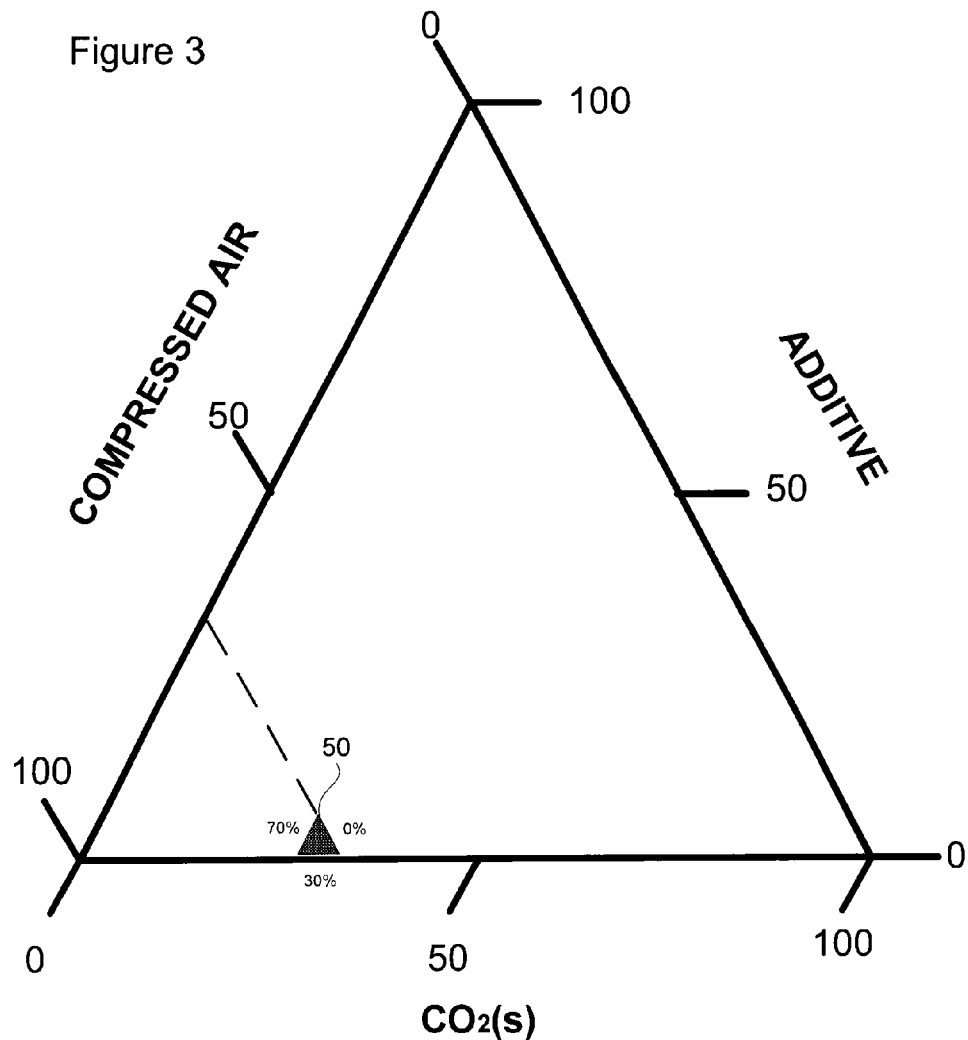
FIG. 3 is a diagram illustrating phase components of a selected cryogenic spray of the present invention.

A composite machining fluid or spray of the present invention is formed by combining fractional concentrations of a coolant phase Fc, a diluent phase Fd and an additive phase Fa, as is generally indicated at 30 in FIG. 1. Each phase, Fc, Fd and Fa, are combined such that the fractional phase components of the composite machining fluid 30 are defined by the following equation:

$$\Sigma(Fc+Fd+Fa)=100\%$$

The resulting machining fluid 30 exhibits selected characteristics of mass, density, wetness, dryness, coldness, hotness, lubricity and other machining fluid characteristics such as desired impact velocity, flowrate, pressure and spray consistency.

The coolant phase Fc used in the present invention has several roles including performing as a de facto lubricant, carrier agent and heat extraction agent. Upon formation, the coolant phase Fc generally has a greater mass and density, at approximately 1.6 grams/ml, as compared to conventional liquid and aerosol sprays. Having a greater density, and when combined with a propulsion agent, the carbon dioxide snow of the coolant phase is able to penetrate a high speed cutting zone and deliver both its coolant packet (sublimation heat) and additive packet deep into the boundary layer. Also, with the heat of vaporization, the sublimating coolant phase (Heat of Sublimation $(\Delta H_s)$–250 BTU/lb) produces greater heat extraction and delivery control as compared to using a boiling liquid carbon dioxide coolant-lubricant (Heat of Vaporization $(\Delta H_v)$–62 BTU/lb). Moreover, as used in the present invention and under diluent pressures of just 550 kPa (80 psi), solid carbon dioxide impacts a surface at a velocity sufficient to liquefy part of the solid phase to fill voids, cracks and other surface irregularities with liquid phase carbon dioxide and additive. Much higher pressures, up to 6.9 MPa (1000 psi), are required to accomplish this when spraying liquid phase carbon dioxide into a cutting zone.

The coolant phase, Fc, suitable for use in the present invention, preferably comprising in part solid phase carbon dioxide, is used at concentrations of between 0% and 100% at a flow-rate of between 0 and 45 grams per second (0.1 pounds per second). Carbon dioxide gas, liquid carbon dioxide or super critical carbon dioxide, preferably at pressures between 2.1 MPa (300 psi) and 13.8 MPa (2000 psi) and temperatures between 273 K and 373 K is used to derive the solid phase carbon dioxide, preferably using any of the following three condensation methods: gas phase carbon dioxide, which may contain or entrain one or more machining lubricant gas additives, is condensed by reducing temperature and/or increasing pressure to form first a liquid phase and condensed further by reducing temperature and/or pressure using a stepped capillary apparatus to form a solid or semi-solid/gas/liquid coolant composition; liquid phase carbon dioxide, which may contain or entrain one or more machining lubricant additives, is condensed by reducing temperature and/or pressure using a stepped capillary apparatus to form a solid or semi-solid/gas/liquid coolant composition; or supercritical phase carbon dioxide, which may contain or entrain one or more machining lubricant additives, is condensed by reducing temperature and/or pressure using a stepped capillary apparatus to form a solid or semi-solid/gas/liquid coolant composition, or may be applied directly to a machining tool interface.

The diluent phase Fd used in the present invention performs several distinct roles, including serving as a physical propulsion agent and carrier fluid which selectively delivers solid coolant and additive agents into a cutting zone, a dilution agent which selectively dilutes the cooling capacity and additive effects of the other composition ingredients, and a temperature regulation agent. The diluent phase Fd also has the ability to selectively control the concentrations of the coolant phase and additive phases which provides variable physicochemistry in the composite spray 30. The diluent phase Fd is preferably derived from an inert gas, including carbon dioxide gas, which beneficially modifies the surface tension and viscosity of various additive phases used within the cryogenic fluid composition 30. Also, employing carbon dioxide gas as the diluent phase in the present invention provides inherent lubrication properties. Carbon dioxide gas may be used with a suitable additive in select machining applications benefiting from both high temperature and high lubricity characteristics. The diluent phase, Fd, suitable for use in the present invention generally comprises any variety of inert gases including, but not limited to, nitrogen, argon, clean dry air, compressed air and carbon dioxide, used at concentrations between 0 and 100%, at pressures between 34 kPa (5 psi) and 34 MPa (5000 psi) at temperatures between 294 K (70 degrees F.) and 477 K (400 degrees F.), and a flow-rate of between 14.6 liters per minute (0.5 cubic feet per minute (cfm)) and 1400 liters per minute (50 cfm).

The additive phase Fa used in the present invention also plays several roles. The additive phase Fa is used to modify either (or both) the diluent or coolant phases to selectively form gas-liquid-solid sprays termed aerosols, cryogenic aerosols termed "Cryosols" herein, cryogenic solid-gas sprays termed "Cryogels" herein, and hybrid composite cryogenic or heated carbon dioxide sprays. Additives used in the present invention provide coolant-lubricant enhancements such as viscosity adjustment, changes to film consistency, corrosion inhibition, and modification of lubricity, among other beneficial effects. The additive phases are derived from a variety of organic and inorganic liquids, solids, and gases. The additive phase, Fa, suitable for use in the present invention is used at concentrations of between 0% and 100% and comprises any variety or mixture of organic liquids, organic gases and solids. Non-exhaustive examples of organic liquids include: bio-based oils, alcohols and esters such as rapeseed, ThetraHydroFurfurylAlcohol (THFA) and ethyl lactate; soy methyl esters; petroleum oils; alcohols such as isopropanol (IPA) and ethanol; ketones such as acetone and MEK; polyglycols; phosphate esters; phosphate ethers; synthetic hydrocarbons; DiethyleneGlycolMonobutylEther (DGME); and silicones. Non-exhaustive examples of organic gases include carbon dioxide and condenseable hydrocarbon additives such as HydroFluoroCarbon 134*a*, a refrigerant gas and butane. Non-exhaustive examples of solids include: oxidation, corrosion and rust inhibitors; extreme pressure agents such as chlorinated paraffinic oils; PolyTetraFluroEthylene (PTFE); boron nitride; pour point additives; detergents; dispersants; foam inhibitors; hydrogen peroxide; percarbonic acid; water; and nanoscopic solid particles such as nanolubricants. Each of the aforementioned exemplary compounds for the additive phase include emulsions and carbonated mixtures. The additive phase Fa may be added indirectly to the coolant phase Fc by first entraining and carrying the additives as an aerosol intermediate composition within the diluent phase Fd and entraining or condensing a portion of the aerosol into the solid carbon dioxide phase Fc, to form a Cryosol or Cryogel fraction. Alternatively, the additive phase Fa may be added directly by injection into the carbon dioxide gas phase Fc, liquid phase Fc or supercritical phase Fc and condensed to form the solid phase carbon dioxide coolant Fc.

A unique aspect of the present invention is that a transient liquid phase Fc is selectively re-formed from the solid phase coolant Fc due to impact stress within the cutting zone. For example, using diluent phase Fd pressures of just 550 kPa (80 psi), solid carbon dioxide particles, which may contain dissolved or entrained additives, contact a machined surface with adequate impact stress, as much as 50 MPa (7,200 psi) or more, to liquefy a portion of the solid coolant phase to fill voids, cracks and other surface irregularities with both liquid phase carbon dioxide, behaving now as a lubricant, and optional additives.

When employing the machining fluid composition of the present invention, as much as 80% of the of the solid phase coolant Fc impacts the cutting zone before completely sublimating, absorbing significantly more heat per volume and depositing its additive component if present. Also, incorporated additive(s) intimated with the machining surface flow freely into and fill voids, cracks and other surface irregularities with the solid and re-formed liquid phase carbon dioxide.

Referring again to FIG. 1, machining fluid 30 are derived and used in the present invention by combining fractional concentrations of coolant phase Fc, diluent phase Fd and additive phase Fa. As such, the composition 30 of the present invention may comprise a single phase composition, a binary phase composition or a ternary phase composition. The vertices of the exemplary fluid or spray composition graph represent the extreme single component elements which may generally be used in selected machining applications including dry cryogenic machining 32 (Fc=100%), dry gas machining 34 (Fd=100%) and wet machining 36 (Fa=100%). Any two sides of the fluid or spray composition 30 graph of FIG. 1 comprise binary mixtures of either coolant-additive spray compositions (Fc+Fa), coolant-diluent spray compositions (Fc+Fd) or diluent-additive spray compositions (Fd+Fa). Within the interior of the spray composition graph exist ternary mixtures of coolant-diluent-additive (Fc+Fd+Fa), and which are combinations of fluid or spray compositions having the widest range of physicochemical properties. For example, small amounts of coolant phase Fc and additive phase Fa are combined with a larger amount of diluent phase Fd to form cool, dry or damp sprays 38; small amounts of diluent phase Fd and additive phase Fa are combined with a larger amount of coolant phase Fc to form cryogenic, dry or damp sprays 40; small amounts of coolant phase Fc and diluent phase Fd are combined with a larger amount of additive phase Fa to form warmer wet sprays 42; and measured amounts of diluent phase Fd, additive phase Fa and coolant phase Fc are combined to form cryogenic wet sprays 44 or cold wet sprays 46. As depicted in FIG. 1, any number of fluid or spray compositions including aerosols, cryosols and cryogels may be formulated to meet the desired needs of a particular machining application.

FIG. 2 depicts an exemplary ternary fluid or spray composition 48 combining solid carbon dioxide coolant phase Fc, clean dry air diluent phase Fd and a soy methyl ester additive phase Fa at a Fc:Fd:Fa ratio of 60:30:10 to form a fluid or spray composition for machining Inconel, a nickel-based alloy with chromium and iron. The diluent pressure is 550 kPa (80 psi) and the composition spray temperature is approximately 227 K (−50 degrees F.). The fluid or spray mixture forms a gel-like or semi-solid consistency because the spray temperature is below the melting point for the soy methyl ester additive. The composite fluid or spray 48 tends to stick to surfaces applied as compared to liquid additive sprays where the melting point temperature has not been reached.

FIG. 3 depicts an exemplary binary fluid or spray composition 50 for machining plastic by combining solid carbon dioxide coolant phase Fc and compressed air diluent phase Fd at a Fc:Fd;Fa ratio of 30:70:0. The diluent phase Fd pressure is 550 kPa (80 psi) and the composition spray temperature is approximately 239 K (−30 degrees F.). The spray mixture forms a gel-like or semi-solid consistency because the spray temperature is below the melting point for the soy methyl ester additive. The composite spray 50 tends to stick to surfaces applied as compared to liquid additive sprays where the melting point temperature has not been reached.

Figure 4:
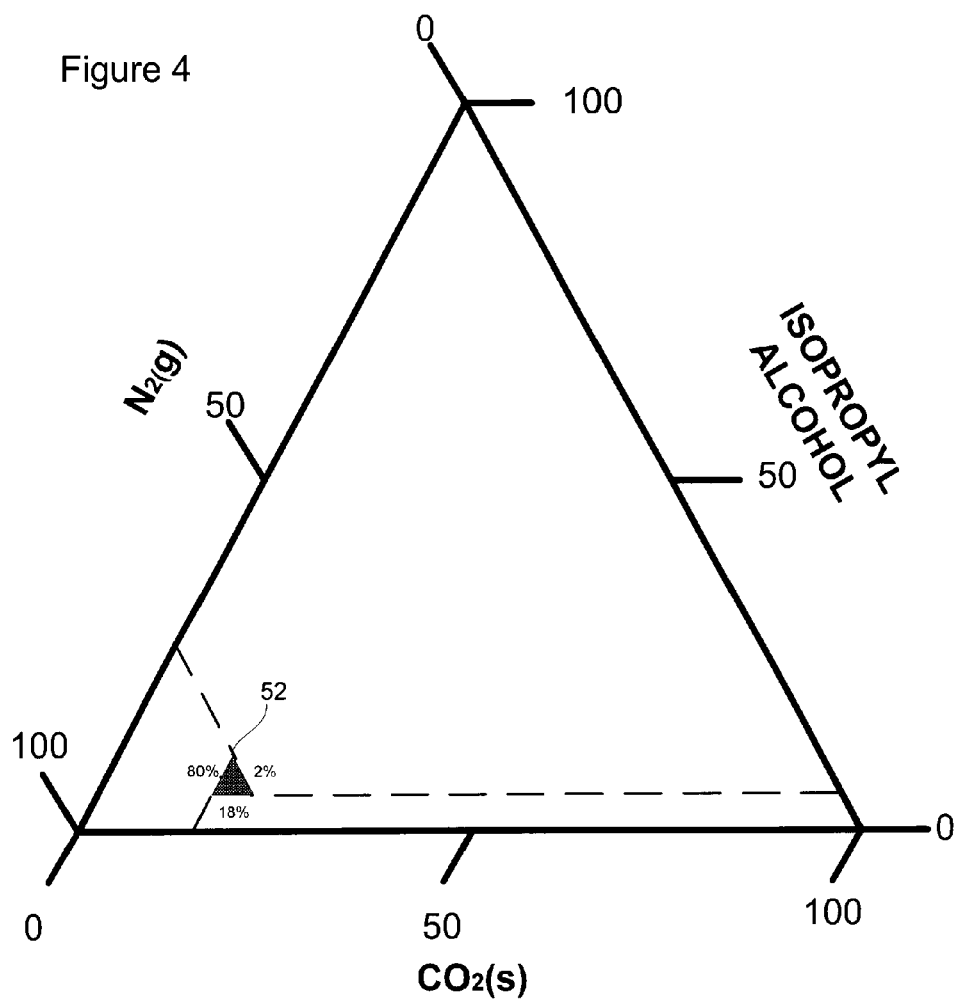
FIG. 4 is a diagram illustrating phase components of a selected cryogenic spray of the present invention.

FIG. 4 depicts an exemplary ternary fluid or spray composition 52 formed for machining glass by combining a solid carbon dioxide coolant phase Fc, a nitrogen gas diluent phase Fd and liquid isopropyl alcohol (IPA) additive at a Fc:Fd:Fa ratio of 18:80:2. The diluent pressure is 550 kPa (80 psi) and the composition spray temperature is approximately 244 K (−20 degrees F.). The composite spray tends to evaporate quickly from surfaces being machined.

Figure 5:
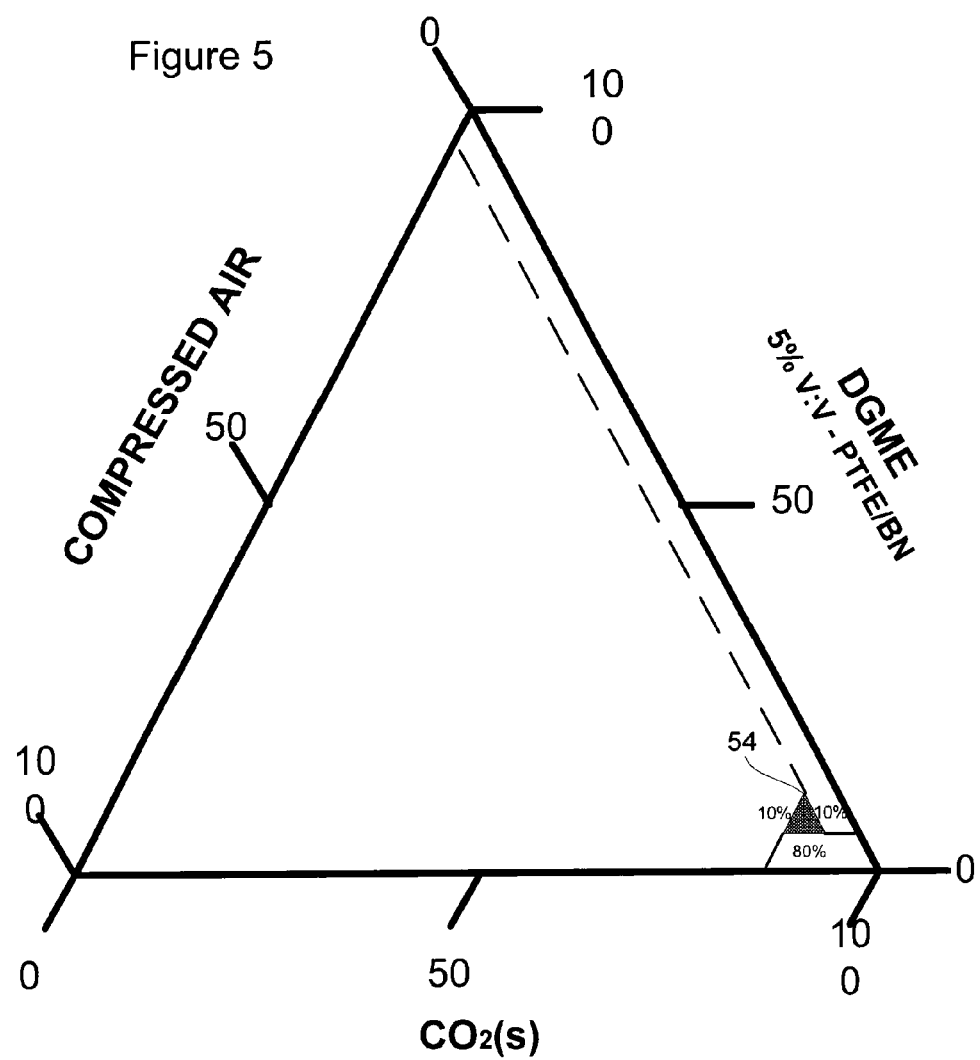
FIG. 5 is a diagram illustrating phase components of a selected cryogenic spray of the present invention.

FIG. 5 depicts an exemplary ternary fluid or spray composition 54 formed for treating titanium by combining solid carbon dioxide coolant phase Fc, compressed air diluent phase Fd and liquid DGME additive Fa, which itself contains a suspension of 5% V:V of PTFE and boron nitride particles, at a Fc:Fd:Fa ratio of 80:10:10. The diluent pressure is 550 kPa (80 psi) and the composition spray temperature is approximately 222 K (−60 degrees F.). The composite spray 54 tends to evaporate quickly from surfaces being machined.

Figure 6:
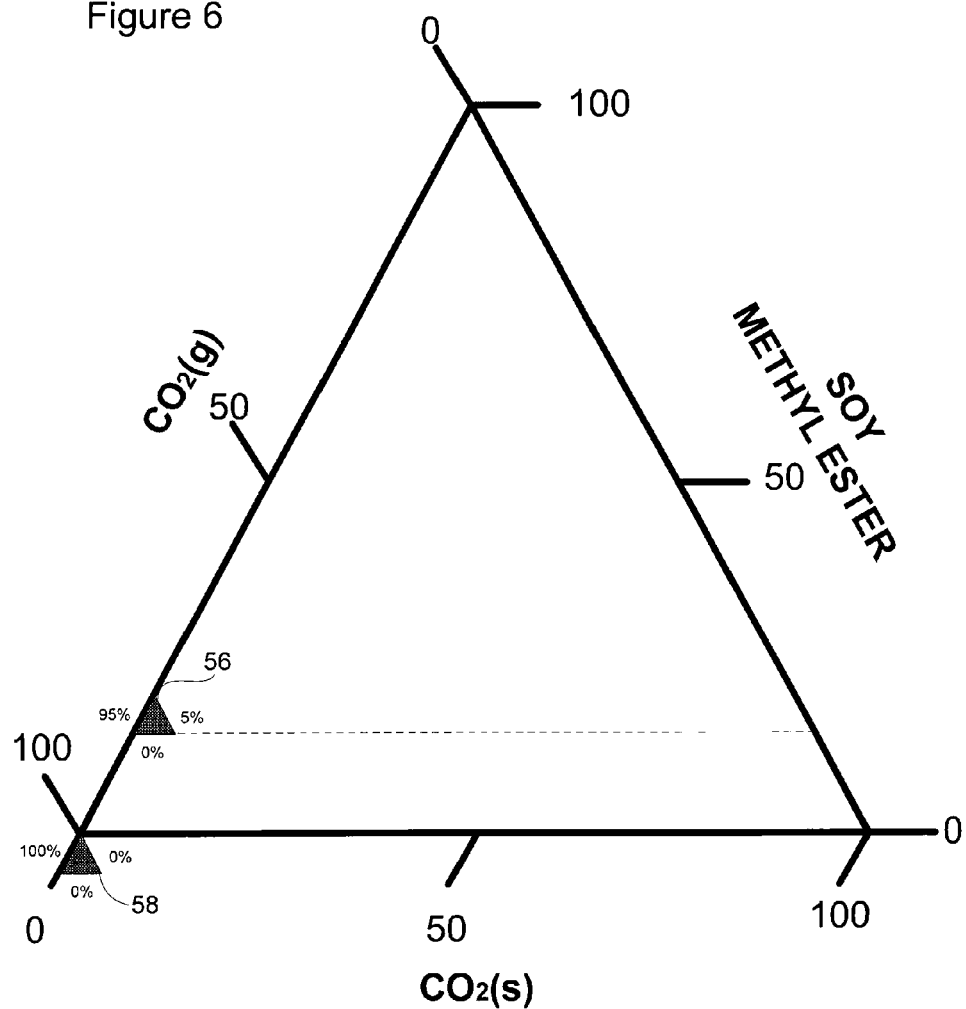
FIG. 6 is a diagram illustrating phase components of selected cryogenic sprays of the present invention.
Figure 14:
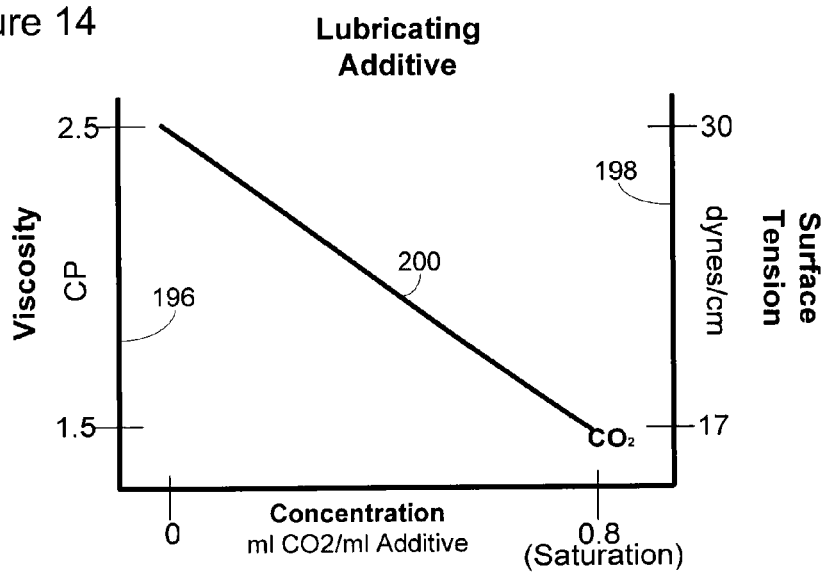
FIG. 14 is a graph illustrating certain physical properties of a lubricating additive used in the cryogenic spray composition of the present invention.

FIG. 6 depicts an exemplary binary fluid or spray composition 56 formed for machining magnesium by combining carbon dioxide gas diluent phase Fd and liquid soy methyl ester additive phase Fa at a Fc:Fd:Fa ratio of 0:95:5. The resulting carbonated soy methyl ester spray has a diluent phase pressure is 1 MPa (150 psi) and the composition spray temperature is approximately 294 K (70 degrees F.). The higher gas spray mixture forms a wet carbonated liquid with lower viscosity and better wetting power than non-carbonated soy methyl ester under these conditions. It is believed by the present inventor, and which is supported in the scientific literature, that improved performance of organic additives used in the present invention is due to the cohesive energy and plasticizing effect of carbon dioxide upon organic liquid additives such as soy methyl ester, which significantly reduces viscosity and surface tension of the resulting composite machining fluid. This effect is described more fully under FIG. 14 herein.

Also depicted in FIG. 6 is a single phase fluid or spray 58 comprising a heated diluent phase Fd of carbon dioxide at a pressure of 690 kPa (100 psi) and temperature of 373 K (212 degrees F.). Such a fluid or spray may be used to provide dry lubrication and chip removal during a ceramic machining process.

Figure 7:
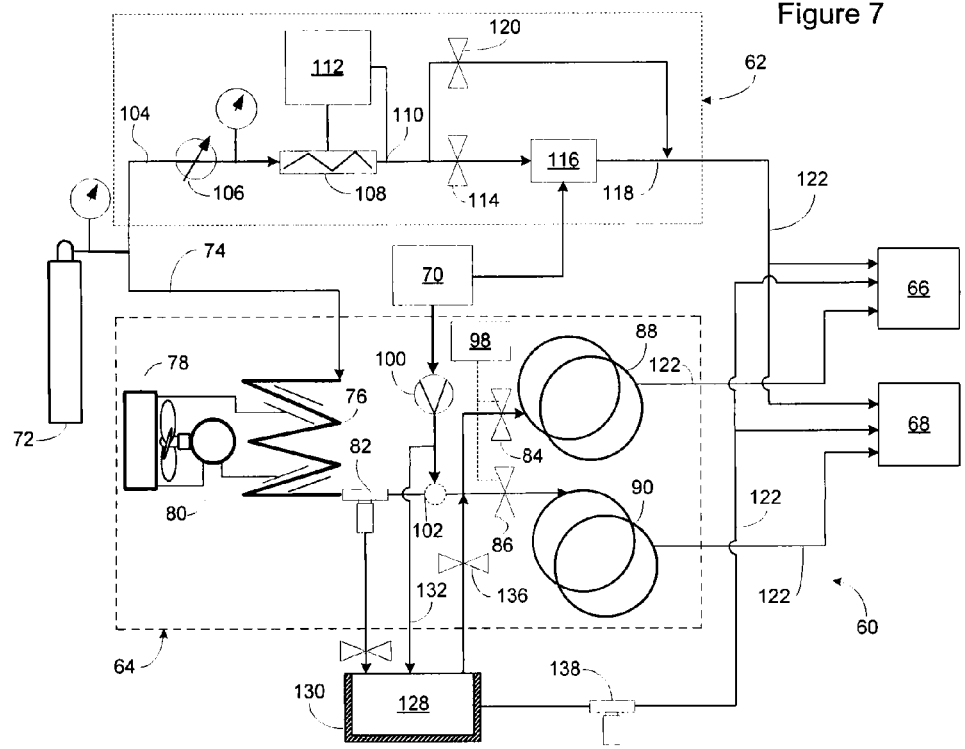
FIG. 7 is a flow-diagram illustrating a system to generate the cryogenic spray of the present invention.

Referring to FIG. 7, a composite fluid or spray generation system 60 for generating the cryogenic machining fluid and composite spray 30 generally includes a diluent phase generator subsystem 62, coolant phase generator subsystem 64, a coaxial machining tool 66 and a fluid or spray applicator 68. Additionally, the diluent phase generator subsystem 62 and coolant phase generator subsystem 64 are individually integrated with an additive phase supply 70. A common supply of high pressure carbon dioxide gas 72 having a preferred pressure range of between 2.1 MPa (300 psi) and 6.2 MPa (900 psi).

Figure 8:
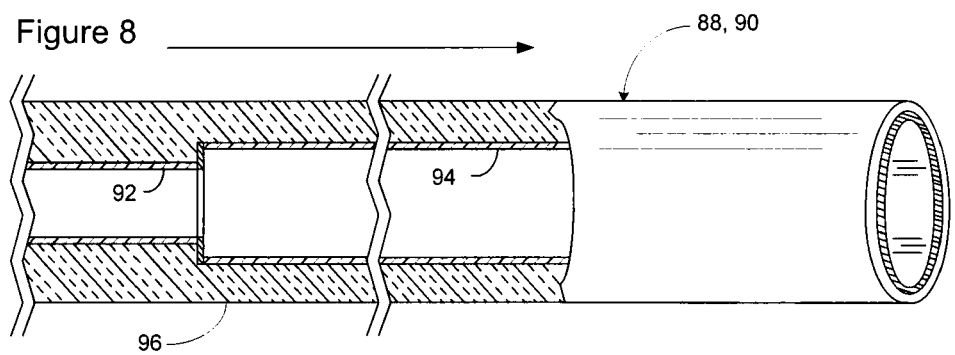
FIG. 8 is a partial cross sectional view of a stepped capillary used to generate the cryogenic spray composition of the present invention.

With respect to the coolant phase generation subsystem 64, carbon dioxide gas contained in a supply cylinder 72 is fed through a connection pipe 74 to a tube-in-tube heat exchanger 76. The common supply of high pressure carbon dioxide gas 72 preferably has a pressure range of between 2.1 MPa (300 psi) and 6.2 MPa (900 psi). Upon the carbon dioxide gas entering the heat exchanger 76, a compressor-refrigeration unit 78 re-circulates cooled refrigerant 80 countercurrent with the carbon dioxide gas contained in heat exchanger 76, condensing the carbon dioxide gas into a liquid carbon dioxide coolant stock. The liquid carbon dioxide coolant stock flows from the heat exchanger through a micrometering valve 82, through one or more base stock supply pulse valves 84, 86 and into one or more stepped capillary condenser units 88, 90. Referring to FIG. 8, the one or more capillary condenser units 88, 90 are preferably constructed using first a segment 92 of smaller diameter polyetheretherketone (PEEK) tubing, for example a 60 cm (24 inch) segment of 0.8/1.6 mm (0.030/0.0625 inch) inside/outside diameter tubing, coupled to a second segment 94 of larger diameter PEEK tubing, for example a 91 cm (36 inch) segment of 1.52/3.18 cm (0.060/0.125 inch) inside/outside diameter tubing, providing a stepped capillary apparatus for condensing, or crystallizing, liquid carbon dioxide into solid carbon dioxide particles having various sizes. Alternatively, the stepped capillary condenser 88, 90 is that as taught by the present inventor and fully disclosed in U.S. Pat. No. 7.293,570 entitled CARBON DIOXIDE SNOW APPARATUS, claiming priority from U.S. Provisional Application No. 60/635,230, both of which are hereby incorporated herein by reference. The stepped capillary condenser 88, 90 efficiently boils liquid carbon dioxide base stock under a pressure gradient to produce a mass of predominantly solid phase carbon dioxide coolant phase Fc. Preferably, the stepped capillary condenser 88, 90 is wrapped with self-adhering polyurethane insulation foam tape 96 as supplied by Armstrong World Industries, Inc. of Lancaster, Pennsylvania.

The coolant stock supply valves 84, 86 may be pulsed first opened and then closed at a pulse rate of greater than 1 pulses per second (>1 Hertz) using one or more electronic pulse timers 98. Additionally, the coolant stock supply valves 84, 86 may be oscillated on and off to feed coolant stock selectively and alternately into each capillary condenser 88, 90 at different times and rates using an electronic oscillator 98. Alternatively, high frequency pulsation may be preferred to introduce significant velocity gradients (energy waves) within the solid particle stream without discontinuing the generation and flow of solid particles. Oscillation may be preferred to selectively introduce coolant flow through additional fluid or spray applicators 68 or to produce alternations within the machine tool applicator 66. Alternating the spray within a cutting zone is beneficial for selectively directing a fluid or spray composition 30 onto a select portion of the cut to optimize cooling and lubrication as well as assist with chip evacuation.

An additive injection pump 100 may be incorporated for injecting an optional additive phase derived from the additive supply 70 and injected and mixed directly into liquid carbon dioxide coolant stock using an in-line static mixer 102 and prior to condensing into a coolant-additive binary composition using the capillary condenser(s) 88, 90.

With respect to the diluent phase subsystem 62, the supply of carbon dioxide gas 72 is fed via a connection pipe 104 and into a pressure reducing regulator 106 regulating the carbon dioxide gas pressure between 70 kPa and 1030 kPa (10 and 150 psi), or more. The regulated carbon dioxide gas is fed into an electrical resistance heater 108 controlled by a thermocouple 110 and temperature controller 112 at a temperature of between 293 K and 473 K, or more. Following this, temperature-regulated carbon dioxide propellant gas may be fed via an aerosol generator inlet valve 114 into an aerosol generator 116. The aerosol generator 116 is connected to the additive supply 70 which mixes a selected amount of the aforementioned additives Fa into the temperature-regulated carbon dioxide propellant gas at a rate of between 0 and 0.02 liters per minute or more, thus forming the temperature-regulated carbon dioxide diluent phase Fd (aerosol) which is fed into a diluent phase feed tube 118. Alternatively, temperature-regulated carbon dioxide propellant gas may be fed via an aerosol generator bypass valve 120, by-passing the aerosol generator 116, and connecting directly into the diluent phase feed tube 118. It should be noted that pressure-regulated compressed air or nitrogen gas, or other inert gas, may be used in place of the pressure-regulated carbon dioxide gas described above to produce the diluent phase supply for the particular machining applications.

Figure 9:
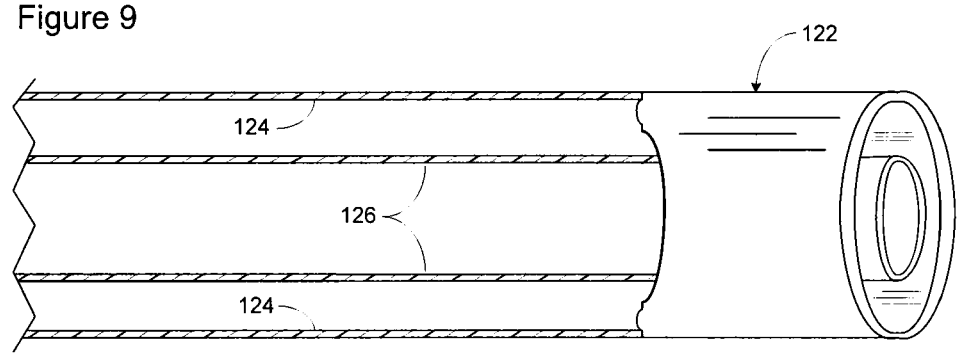
FIG. 9 is a partial cross sectional view of a delivery line of used to transport the cryogenic spray composition of the present invention.

Having formed a coolant phase Fc, containing option additive phase component if desired, and a diluent phase Fd, containing optional additive phase component if desired, as described above, both components Fc and Fd are integrated and delivered to the machine tool 66 and/or the spray applicator 68 using a coaxial spray delivery line 122. The coaxial delivery line 122, as illustrated in FIG. 9, comprises an outer diluent phase delivery tube 124 for containing and delivering the diluent phase and additive phase, and an inner PEEK tube 126 for containing and delivering the coolant phase and optional additives. The delivery line 122 preferably has an overall length necessary to deliver the coolant/additive phase and diluent/additive phases to the machining tool 66 and spray applicator 68. Preferably, the coaxial machining tool 66 is that as taught by the present inventor and fully disclosed in U.S. application Ser. No. 11/301,441 which is hereby incorporated herein by reference. Preferably, the fluid or spray applicator is a co-axial dense fluid spray applicator as taught by the present inventor and fully disclosed in U.S. Pat. No. 5,725,154 which is hereby incorporated herein by reference. More preferably, the fluid or spray applicator is a tri-axial type delivering device as taught by the present inventor and fully disclosed in U.S. Provisional Application No. 60/726,466, which is hereby incorporated herein by reference. It should be noted, however, that any type of machining tool 66 or spray applicator 68 capable of applying the composite fluid or spray is well within the scope of the present invention.

Additionally, the coolant phase composition, with optional additive, may be derived from a supply of supercritical phase carbon dioxide. In certain instances, additive components may be more easily solubilized in a supercritical phase carbon dioxide as compared to liquid carbon dioxide due to cohesion energy differences. Referring back to FIG. 7, a pressure reactor 128 having a band heater 130 is fed liquid carbon dioxide coolant stock from the carbon dioxide generation subsystem 64. The liquid carbon dioxide stock may be blended with selected additive(s) from additive supply line 132 using the metering pump 100. The pressure and temperature within the mixed reactor 128 are raised above the critical point for the mixture to form a supercritical fluid coolant base stock. Experimentation may be required to determine the exact critical parameters for any given coolant mixture. Once formed, the homogenized supercritical fluid coolant stock may be metered directly into the selected capillary condenser 88, 90 using a metering valve 134 and pulse valve assembly 102 to form the coolant phase Fc as described herein. Alternatively, the supercritical fluid-based coolant-additive phase may be applied directly to a machining surface through a ball valve 136 and into either the machine tool 66, the spray applicator 68 or both. It should be noted, however, that FIG. 7 is for illustrative purposes only, and does not include all possible valve configurations.

Figure 10:
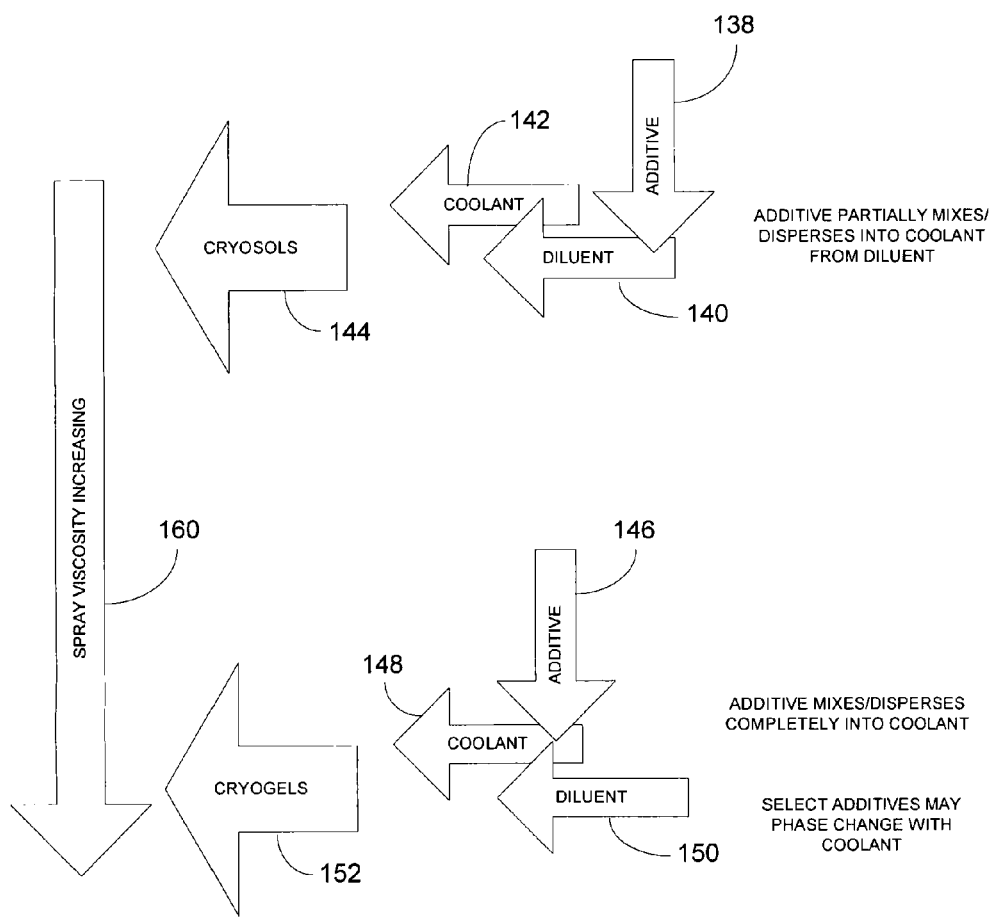
FIG. 10 is a diagram illustrating the effects of spray viscosity of Cryosols and Cryogels with the addition of selected additives.

Coolant-lubricant spray consistency (mist-like, liquid-like, gel-like) may be a highly desirable attribute for a particular machining application. Using the present invention, spray consistency can be variably controlled from heated gas or gases that cool and discharge light machining chips, heated or unheated liquid-gas sprays (aerosols/cryosols) that immediately film and evaporate from an applied surface, gel-like viscous cold solid-gas sprays (Cryogels) that tend to stick to an applied surface, and any hybrid form within this range. This is accomplished by controlling additive phase concentration, additive injection/mixing point, coolant particle size and concentration, and diluent phase flow, pressure and temperature. Referring to FIG. 10, adding a additive phase 138 to a diluent phase 140 to form an Aerosol (intermediate composition) and selectively mixing said Aerosol into a coolant phase 142 will produce a variety of Cryosol sprays 144 having gas-liquid, gas-solid or gas-solid-liquid consistencies. By contrast, selectively adding an additive phase 146 such as soy methyl ester into a coolant phase 148 forms a Cryogel intermediate compound. Selectively forming and mixing said Cryogel into a diluent phase 150 produces a variety of Cryogel spray compositions 152 having cold gas-liquid to gas-solid consistency. Using these different mixing and delivery techniques described above, the viscosity 154 of the spray mixture can be altered from very low to very high viscosity, which is very useful when optimizing a particular machining fluid application.

The coolant phase Fc of the present invention, which provides selective machining heat extraction elements as well as lubrication, comprising solid carbon dioxide may be used at a mass injection range of 0 to 45 grams per second (0.1 lbs/sec), or more. In addition the particle composition may be altered to provide large or small solid particles, which is beneficial for adjusting impact stress and penetration into a machining interface, as will be discussed. Moreover, pulsing or oscillating coolant sprays used in the present invention may be employed to provide beneficial physical energies such as increased outflow velocities and a more turbulent boundary layer. Also, pressure spikes or thermoacoustic waves created through rapid velocity changes produce and sustain much higher peak velocities as compared to continuous flow fluid velocities, which can be as high as 500 meters/sec. Oscillatory flow prevents boundary layer thickening by increasing the surface outflow velocities which results in increased snow particle-surface impacts and more efficient solid-liquid transitions. This allows for the delivery of the impacting fluid or spray particles to a greater surface area with shorter contact duration. Thus Hertzian sprays more efficiently unload with the complex topography of a substrate surface which decreases boundary layer thickness and viscosity, increases surface penetration and improves energy exchange.

The diluent phase Fd, an inert gas, may be used at pressures of between 0 and 34.5 MPa (5000 psi), flows of between 0 and 1.4 meters cubed per minute (50 cfm) and temperatures of between 294 K and 478K (70 and 400 degrees F.). The diluent phase Fd used in the present invention provides physical control of the fluid or spray; providing a coolant-additive dilution, temperature control and fluid or spray propulsion.

The additive phase Fa, which can be a solid, liquid or gas, is used to modify either the coolant or diluent phases to impart physicochemical characteristics such as viscosity, enhanced lubricity, and wetness. It may be added to the coolant and diluent phases in concentrations of between 0 and 100% by volume. The additive phase may include gaseous constituents, such as phase change constituents, that are condensed as a liquid phase into the coolant phase to form a wet liquid-solid coolant phase. Compared to conventional flooded liquid coolants and lubricants, as well as high pressure liquid carbon dioxide sprays described in prior art, the cryogenic machining sprays of the present invention provide several functional advantages such as variable and higher density, as much as 60% greater bulk fluid density (solid carbon dioxide—1.6 g/ml versus liquid coolant—1.0 g/ml), variable viscosity, low surface tension of 5 dynes/cm, variable heat capacity from 4.7 Kw (16,000 BTU/hour) of heat extraction to 2.5 Kw (8,500 BTU/hour), and high penetration velocities of up to 500 m/sec.

Figure 11:
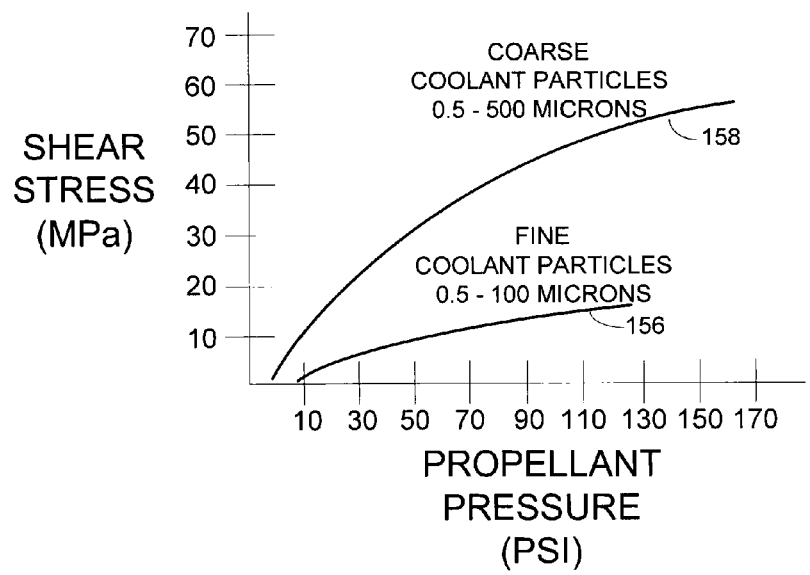
FIG. 11 is a graph illustrating the Shear Impact Pressures for selected particle sizes of the cryogenic spray composition of the present invention.

Referring to FIG. 11, the present invention can produce solid carbon dioxide particles having diameters ranging 0.5 to 500 microns (fine to coarse) which are able to produce variable impact stresses. A fine particle spray 156 can produce a range of impact stresses from <0.1 MPa to approximately 15 MPa at diluent phase pressures of between 0 and 1 MPa (150 psi). A coarse particle spray 158 can produce a range of impact stresses from <0.1 MPa to approximately 50 MPa at diluent phase pressures of between 0 and 1 MPa (150 psi). Higher impact stresses can be imparted at higher diluent phase pressures and lower impact stresses are able to be imparted at lower diluent phase pressures. Diluent spray pressure and temperature can be used selectively to alter both the impact stress and impact particle density by selectively sublimating a portion of the solid phase carbon dioxide Fc particles entrained in the diluent phase in transit to the substrate surface through heat transfer from the diluent phase Fd to the solid carbon dioxide phase Fd. Moreover, spray impact stress experiments performed using Prescale Series contact pressure measuring films, manufactured by FujiFilm USA, reveal that spray impact pressures may be selectively controlled by controlling the composition of the various coolant, additive and diluent phases described in the present invention. Particle size and consistency control is accomplished using various lengths and diameters of capillary condensers to produce a mass of sublimable particles and coupling said particle stream with a diluent phase, as disclosed in U.S. Pat. No. 7,293,570, already referenced herein.

Figure 12:
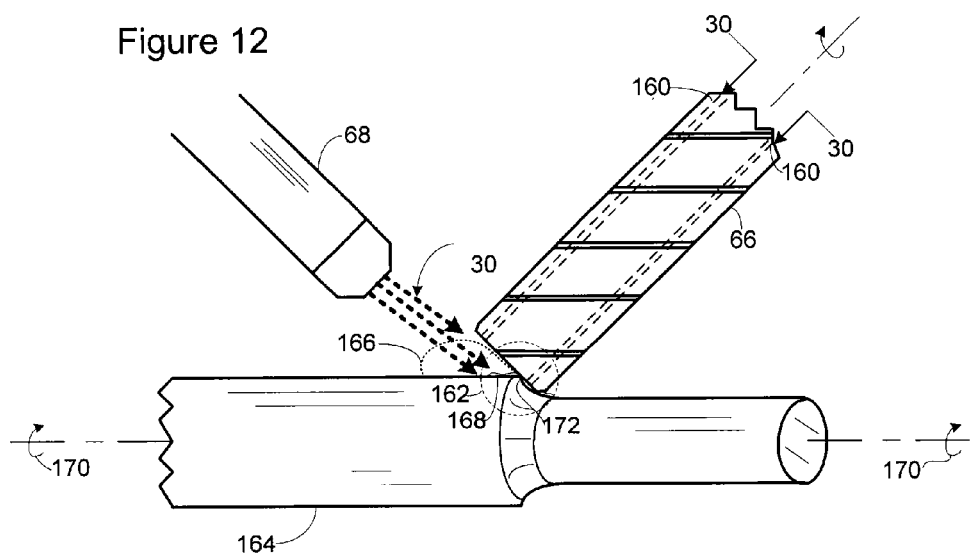
FIG. 12 is a side view of the spray composition of the present invention being applied during a machining operation.

Referring to FIG. 12, the delivery line terminates with a mating coaxial adaptor (not shown) whereupon the fluid or spray composition is fed either into coaxial ports 160 within the machining tool 66 or the fluid or spray applicator 68. The composite sprays produced and delivered either through the coaxial machining tool 66 and/or the spray applicator are selectively directed into a cutting zone 162 and/or workpiece substrate 164 to provide boundary layer cooling and lubrication, selective build-up edge (BUE) removal 166. During machining, composite fluid or spray particles penetrate the cutting zone 162, tool-workpiece and tool-chip interfaces, wetting or wicking into said interfaces, sublimating, supercooling and liquefying under the impact stresses generated. Simultaneously with the penetration into the cutting zone 162, solid carbon dioxide particles change phase to form gas and liquid carbon dioxide films, providing a thin carbonated lubricating (additive) and cooling film 168 at the interface. Liquid carbon dioxide and carbonated films 168 have extremely low viscosities of between $1 \times 10^{-4}$ Pascal seconds (0.1 cP) and 0.01 Pascal seconds (10 cP) and surface tensions of between $5 \times 10^{-6}$ J/cm$^2$ (5 dynes/cm) and $1 \times 10^{-5}$ J/cm$^2$ (10 dynes/cm), which enable fluid or spray constituents, such as entrained additives, to penetrate into microscopic surface voids and cracks (not shown) and deposit thin films of additive phase when present. Diluent phase pressure is adjusted as necessary to enable composition particles and additives to overcome centrifugal forces generated by high rotational speeds 170 and penetrate the machine tool-workpiece interface 172. Several types of fluid or spray configurations are possible using the present invention, including continuous, pulsed fluid or spray, and oscillating sprays, with a lubricating fluid or spray or dry spray characteristics, and heating or cooling spray characteristics.

Figure 13:
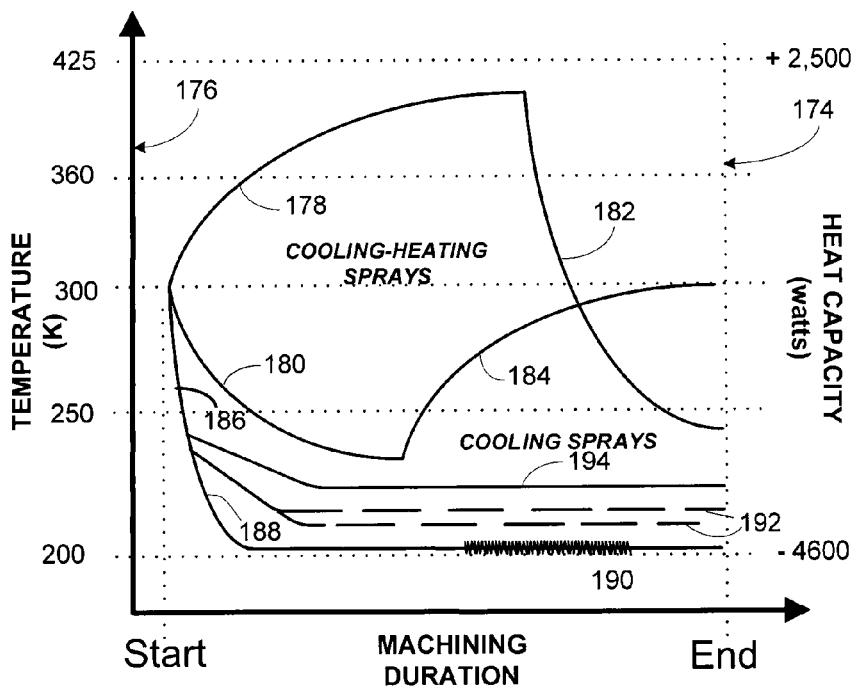
FIG. 13 is a graph illustrating profiles of Exemplary Spray Temperatures and Heat Capacities of selected cryogenic sprays of the present invention.

Referring to FIG. 13, the aforementioned fluid or spray configurations can be composed and selectively delivered to produce a range of thermal capacities; a single coaxial composite fluid or spray can provide from 4.7 Kw (16,000 BTU/hour) of heat extraction to 2.5 Kw (8,500 BTU/hour) of heat input 174 and a variety of temperatures from 197 K (−105 degrees F.) to 422 K (300 degrees F.) 176, or more during a machining operation. Heating sprays 178, which have temperatures above the temperature of the cutting zone, add heat to a substrate surface. Cooling sprays 180, which have temperatures below the temperature of the cutting zone, extract heat from a substrate surface. The heating and cooling sprays may be applied in combination to produce any variety of machined substrate thermal cycles. For example one exemplary thermal cycle demonstrates first applying a heating fluid or spray 178 having a temperature above 358 K (185 degrees F.) followed by a cooling fluid or spray 182 having a temperature below 244 K (−20 degrees F.). Another exemplary thermal profile, demonstrates first applying a cooling fluid or spray 180 to reach a substrate temperature below 244 K (−20 degrees F.) followed by a heating fluid or spray 184 to return the substrate back to ambient temperature. Another example profile shows applying a cooling fluid or spray 186 which produces a substrate having a temperature approaching 197 K (−105 degrees F.) 188, the sublimation temperature for solid carbon dioxide. Moreover, Hertzian pulsation 190, multiple coax oscillation 192 or continuous flow 194 of the coolant phase may be applied. These various physical fluid or spray energy augmentations can enhance heat transfer between the spray particles and substrate surface as well as improve machining swarf ejection during a machining operation.

Carbon dioxide, unlike other diluent phase fluids such as compressed air, nitrogen or argon, can chemically enhance additive chemistries because of its much large molecular cohesion energy. To demonstrate this chemical enhancement effect, and referring to FIG. 14, the viscosity 196 and surface tension 198 of a typical lubricating additive phase (soy methyl ester) under atmospheric pressure and saturated with carbon dioxide exhibits a 30% to 40% decrease 200 in both viscosity and surface tension. Carbon dioxide swells or plasticizes organic additives, which reduces internal friction. This chemical enhancement effect combined with the physical energy aspects of the present invention, including propellant thrust and momentum transfer, translates into extremely effective penetration into boundary regions such as those present in high speed, high force machining. This carbon dioxide chemical enhancement can be introduced and controlled by adding an additive phase into a carbon dioxide gas used in the diluent phase and/or mixing an additive phase into the coolant phase.

Figure 15:
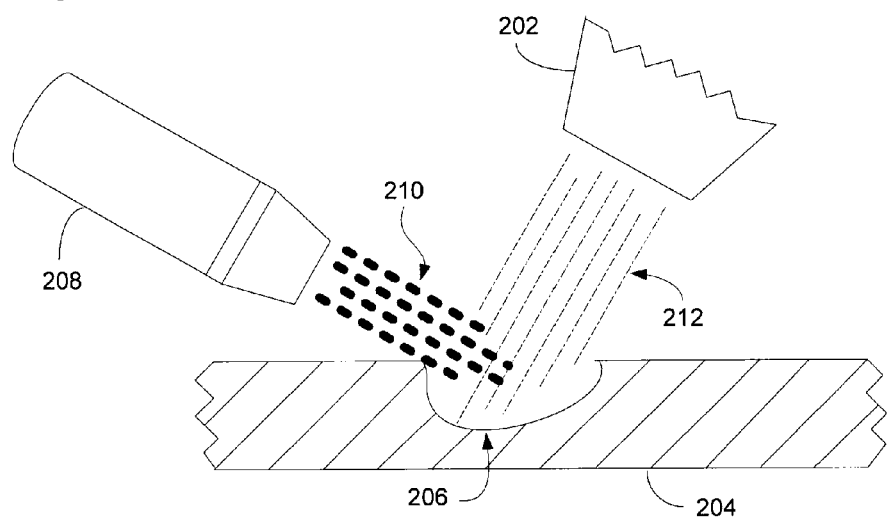
FIG. 15 is a side view of the cryogenic spray composition of the present invention being applied during a laser machining operation.

Another aspect of the present invention is the use of the composite machining fluid or spray in laser machining operations. Referring to FIG. 15, a laser 202 is directed at a substrate 204 wherein the laser cuts or ablates the substrate. In order to contain a heat affected zone 206 when lasing polymeric or metallic materials, a spray applicator 208 directs a composite machining fluid or spray 210 of the present invention towards the ablation area. The composite machining fluid or spray 210 passes through a beam 212 emitted by the laser 202 and extinguishes excess burning which minimizes or eliminates plasma formation, fumes and soot generation (polymers) within the ablation area. This results in little or no attenuation of the laser power reaching the substrate surface to perform more precise and pyrolytic laser ablation processes, further resulting in the elimination of laser optical surface build-up and light obscuration. Additionally, upon applying the composite fluid or spray of the present invention, lased substrate surfaces remain cool and dry during ablation operation, with the substrate requiring no cleaning operation upon completion. Thus, the cryogenic composite fluid or spray of the present invention uniquely enables laser machining without the coolant itself attenuating the laser light contacting the substrate surface for wavelengths generated by most common machining lasers.

Tables 1 and 2 list non-exhaustive examples of infrared (IR) and ultraviolet (UV) lasers for use with the present invention.

TABLE 1

Exemplary Infrared Lasers

| Lasing Medium | Laser Type | Wavelength |
|---|---|---|
| Er: Glass | Solid State | 1540 nm |
| Cr: Forsterite | Solid State | 1150-1350 nm |
| HeNe | Gas | 1152 nm |
| Argon | Gas-Ion | 1090 nm |
| Nd: YAP | Solid State | 1080 nm |
| Nd: YAG | Solid State | 1064 nm |
| Nd: Glass | Solid State | 1060 nm |
| Nd: YLF | Solid State | 1053 nm |
| Nd: YLF | Solid State | 1047 nm |
| InGaAs | Semiconductor | 980 nm |
| Krypton | Gas-Ion | 799.3 nm |
| Cr: LiSAF | Solid State | 780-1060 nm |
| GaAs/GaAlAs | Semiconductor | 780-905 nm |
| Krypton | Gas-Ion | 752.5 nm |
| Ti: Sapphire | Solid State | 700-1000 nm |

TABLE 2

Exemplary UV Lasers

| Lasing Medium | Laser Type | Wavelength |
|---|---|---|
| Argon | Gas-Ion | 364 nm (UV-A) |
| XeF | Gas (excimer) | 351 nm (UV-A) |
| N2 | Gas | 337 nm (UV-A) |
| XeCl | Gas (excimer) | 308 nm (UV-B) |
| Krypton SHG | Gas-Ion/BBO crystal | 284 nm (UV-B) |
| Argon SHG | Gas-Ion/BBO crystal | 264 nm (UV-C) |
| Argon SHG | Gas-Ion/BBO crystal | 257 nm (UV-C) |
| Argon SHG | Gas-Ion/BBO crystal | 250 nm (UV-C) |
| Argon SHG | Gas-Ion/BBO crystal | 248 nm (UV-C) |
| KrF | Gas (excimer) | 248 nm (UV-C) |
| Argon SHG | Gas-Ion/BBO crystal | 244 nm (UV-C) |
| Argon SHG | Gas-Ion/BBO crystal | 238 nm (UV-C) |
| Argon SHG | Gas-Ion/BBO crystal | 229 nm (UV-C) |
| KrCl | Gas (excimer) | 222 nm (UV-C) |
| ArF | Gas (excimer) | 193 nm (UV-C) |

Figure 16:
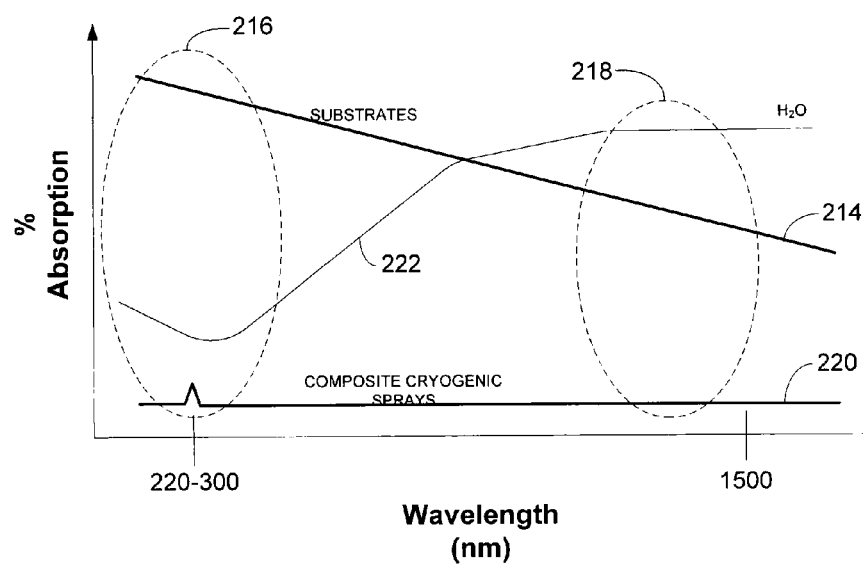
FIG. 16 a graph illustrating physical properties of infrared and ultraviolet lasers.

FIG. 16 graphically illustrates contrasting generalized light absorption profiles for substrates, composite sprays of the present invention, and the commonly used lasers listed in Tables 1 and 2. FIG. 16 also overlays a generalized absorption profile for water, which is typically considered a laser machining process impediment. It can also be seen from FIG. 16 that polymeric and metallic substrates 214 generally fall along a path from increased absorption within the highly energetic UV regions 216 to a lower absorption within the less energetic IR light regions 218. The exemplary IR lasers listed in Table 1 fall within discrete bands ranging from 700 nm to 1540 nm, while the exemplary UV lasers listed in Table 2 fall within discrete bands ranging from 284 nm to 364 nm. Overlaying these exemplary substrate and laser spectrums is the carbon dioxide absorption spectrum 220 which exhibits very little or no absorption within the common IR and UV laser machining bands. This is beneficial because the composite coolant sprays of the present invention do not themselves become light-attenuating impediments to the laser machining process. Also, it can also be seen that water 222 exhibits a generalized light absorption profile that tends to increase in both the UV and IR laser bands which attenuates and reflects laser light at the substrate surface-laser contact point. Composite machining fluids and sprays of the present invention therefore produce dry-cold composite sprays which, during laser ablation or machining, minimize or eliminate condensed solidified or liquefied water from entering the laser cutting zone.

EXAMPLES

Several experiments were designed and performed to compare and contrast the relative performance of the present invention against exemplary conventional cooling and lubrication techniques. In the experiments that follow, it should be noted to those skilled in the art that optimum fluid or spray composition parameters such as spray distance, fluid or spray composition, spray angle, spray delivery means, and optimum number of spray delivery devices for a given machining operation were not optimized. The purpose of the experiments was to gage the performance of the composite sprays herein under approximately similar application conditions and replicated machining operations.

High Speed Precision Grinding

A machining test was performed to examine the machined surface quality and compare this to conventional flooded coolants. The machining process performed was a rough and finish grinding of a stainless steel-steatite-epoxy article having a steatite portion 224, an epoxy portion 226 and an Iron/Nickel alloy (Alloy 52) portion 228. The machining process was accomplished using a diamond grinding tool operating at 20,000 rpm in a Tsugami Model MA3 HMC. The cryogenic machining fluid derived from the present invention was a composite spray composition comprising solid carbon dioxide as the coolant Fc, compressed air as the diluent Fd and isopropyl alcohol as the additive Fa at a Fc:Fd:Fa ratio of 18:80:2 was used at a diluent pressure of 620 kpa (90 psi), producing a composite spray temperature of approximately 240 K (−30 degrees F.). The composite spray was directed into the cutting zone at the contact point between a diamond grinding tool and the inside surface of the machined article using a 45 degree angled coaxial spray nozzle, shown below.

Figure 17A:
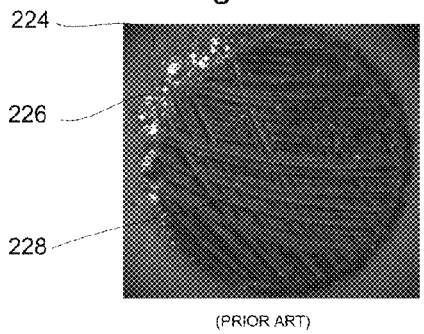
FIG. 17a is a photomicrograph of a substrate treated with a spray of the prior art.
Figure 17B:
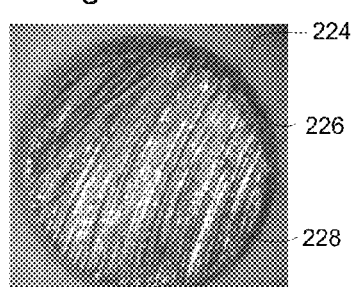
FIG. 17b is a photomicrograph of a substrate treated with a selected cryogenic spray composition of the present invention.
Figure 18A:
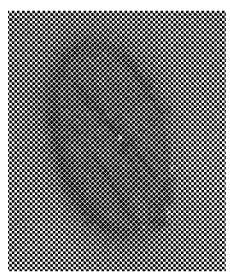
FIG. 18a is a photomicrograph of a substrate treated with a spray of the prior art.
Figure 18B:
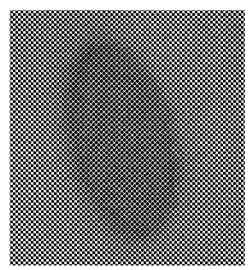
FIG. 18b is a photomicrograph of a substrate treated with a selected cryogenic spray composition of the present invention.

Results from the machining experiment show that a better quality finish is obtained using a composite spray of the present invention as compared to a conventional flooded coolant system, as depicted in FIGS. 17a, 17b and 18a, 18b. Referring to the FIGS. 17a and 18a, the conventional approach causes smearing of the soft alloy and deep grooves from the grinding bit, suspected to be caused by insufficient chip removal, cooling and/or lubrication within the high speed grinding zone. In contrast, the present invention produces a very clean and bright finish with excellent separation of steatite, epoxy and metal bands, as depicted in FIGS. 17b and 18b.

Low-Speed Drilling of Stainless Steel

A machining test was performed to examine the surface quality of a stainless steel sheet drilled with a carbide drill bit. A 0.64 cm (0.25 inch) substrate of stainless steel was drilled using a Ryobi Drill Press, Model No. DP100, at a drilling speed of 3,600 rpm. Three spray compositions were derived. The first spray composition consisted only of cooled compressed air as the diluent, representing the prior art, with no coolant or additive phases for a Fc:Fd:Fa ratio of 0:0:100, and applied at a diluent pressure of 550 kPa (80 psi) and 57 liters per minute (2 cfm), producing a composite spray temperature of approximately 283 K (50 degrees F.). The second spray composition comprised solid carbon dioxide as the coolant, compressed air as the diluent and no additional additive phase for a Fc:Fd:Fa ratio of approximately 30:70:0, and applied at a diluent pressure of 550 kPa (80 psi) and temperature of 373 K (212 degrees F.), producing a composite spray temperature of approximately 240 K (−30 degrees F.). The third spray composition comprised solid carbon dioxide coolant, compressed air as the diluent and soy methyl ester as the additive for a Fc:Fd:Fa ratio of approximately 29:70:1, and was applied at a diluent pressure of 550 kPa (80 psi) and temperature of 373 K (212 degrees F.), producing a composite spray temperature of approximately 240 K (−30 degrees F.).

Figure 19A:
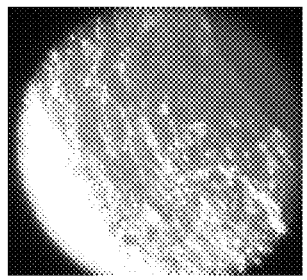
FIG. 19a is a photomicrograph of a substrate machined using a spray treatment of the prior art.
Figure 19B:
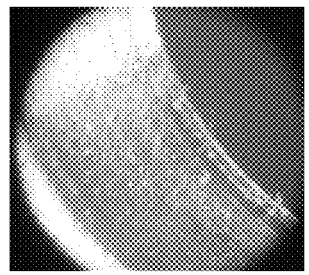
FIG. 19b is a photomicrograph of a substrate machined using a first selected cryogenic spray composition of the present invention.
Figure 19C:
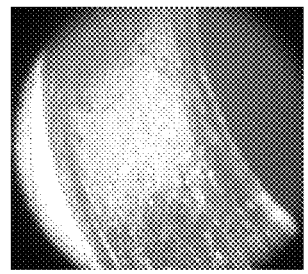
FIG. 19c is a photomicrograph of a substrate machined using a second selected cryogenic spray composition of the present invention.

Each test spray was directed into the cutting zone at the contact point between a drilling tool and contacting surface of the machined article using an approximate 45 degree spray angle. FIG. 19a depicts a machined hole treated with the first spray, while FIG. 19b depicts a machined hole treated with the second spray and the FIG. 19c depicts a machined hole treated with the third spray. The results shown below demonstrate the progressive improvement in machined surface quality from cool air machining to cryogenic composite sprays of the present invention.

IR Laser Milling of Butyl Rubber

A machining test was performed to examine the surface quality of a butyl rubber milled using an IR Diode Laser with a 60 Watt power source and operating at a wavelength of approximately 940 nm as compared to using gas-assist cooling. A 0.64 cm (0.25 inch) substrate of butyl rubber was milled using an Opto Power Laser System, Model No. H01 D060 MMM FCMS, equipped with a IR Laser power control unit and fiber optically delivered Laser beam module Model Number OPC-OPC-02. An automated rectangular scan pattern was performed using a Janome Cartesian Robot, Model No. JR2203. Robot scan speed was set to 10 mm/sec with the Laser focuses at a distance of approximately 2.54 cm with a plunge depth (Laser Focusing Distance) of approximately 0.5 mm. Laser power was adjusted to 25 watts with approximately a 1 mm beam diameter. A rectangular pattern of approximately 1.0 cm×0.5 cm was milled into each sample surface for each type of spray tested.

Two spray compositions were derived. The first spray composition, representing the prior art, consisted only of carbon dioxide with no additive or coolant phases for a Fc:Fd:Fa ratio of 0:100:0, and applied at a diluent pressure of 550 kPa (80 psi) and temperature of 294 K (70 degrees F.), producing a composite spray temperature of approximately 294 K (70 degrees F.). The second spray composition comprised solid carbon dioxide as the coolant, compressed air as the diluent and no additive phase for a Fc:Fd:Fa ratio of approximately 20:80:0, and was applied at a diluent pressure of 550 kPa (80 psi) and temperature of 373 K (212 degrees F.), producing a composite spray temperature of approximately 244 K (−20 degrees F.).

Figure 20A:
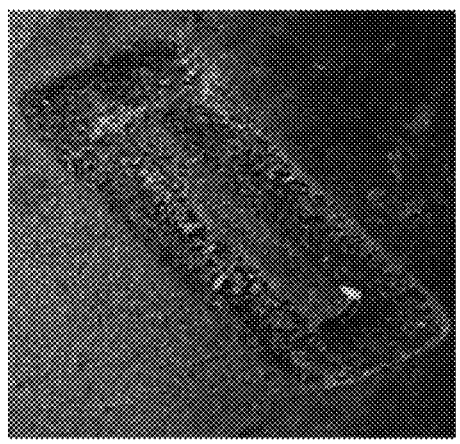
FIG. 20a is a photomicrograph of a substrate treated with a spray of the prior art.
Figure 20B:
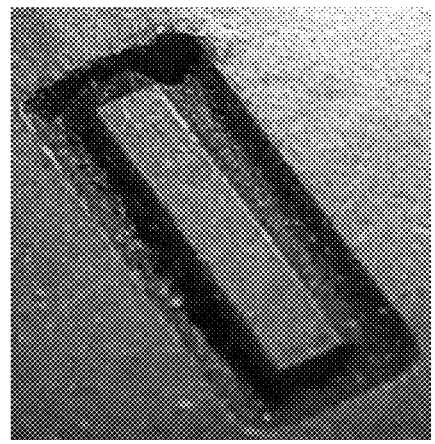
FIG. 20b is a photomicrograph of a substrate treated with a selected cryogenic spray composition of the present invention.

FIG. 20a depicts the substrate treated with the first spray of the prior art, while FIG. 20b depicts the substrate treated with the second spray of the present invention. The results demonstrate that Laser milling with a spray composition of the present invention as compared to gas-assist Laser milling produces a cleaner channel and minimal sidewall melting. A closer look at the machined surfaces reveals the improvements in sidewall definition, deeper trench depth, and cleaner channel cut using a composite spray of the present invention with IR Laser machining.

An interesting observation during Laser machining was that the composite spray of the present invention produced much less black char and residues following machining. The gas assist test produced an extremely dirty surface and significant airborne soot following processing.

IR Laser Milling of Fluorosilicone Rubber

A machining test was performed to examine the surface quality of a fluorosilicone rubber milled using an IR Diode Laser with a 60 Watt power source and operating at a wavelength of approximately 940 nm. A 0.64 cm (0.24 inch) substrate of fluorosilicone rubber was milled using an Opto Power Laser System, Model No. H01 D060 MMM FCMS, equipped with a IR Laser power control unit and fiber optically delivered Laser beam module Model Number OPC-OPC-02. An automated rectangular scan pattern was performed using a Janome Cartesian Robot, Model No. JR2203. Robot scan speed was set to 10 mm/sec with the Laser focuses at a distance of approximately 2.54 cm with a plunge depth (Laser Focusing Distance) of approximately 0.5 mm. Laser power was adjusted to 25 watts with approximately a 1 mm beam diameter. A rectangular pattern of approximately 1.0 cm×0.5 cm was milled into each sample surface for each type of spray tested.

Two spray compositions were derived. The first spray composition, representing the prior art, consisted only of carbon dioxide gas as the diluent with no additive or coolant phases for a Fc:Fd:Fa ratio of 0:100:0, and was applied at a diluent pressure of 550 kPa (80 psi) and temperature of 294 K (70 degrees F.), producing a composite spray temperature of approximately 294 K (70 degrees F.). The second spray composition, representing the present invention, comprised of solid carbon dioxide as the coolant, compressed air as the diluent and no additive phase for a Fc:Fd:Fa ratio of approximately 20:80:0, and applied at a diluent pressure of 550 kPa (80 psi) and temperature of 373 K (212 degrees F.), producing a composite spray temperature of approximately 244 K (−20 degrees F.).

Figure 21A:
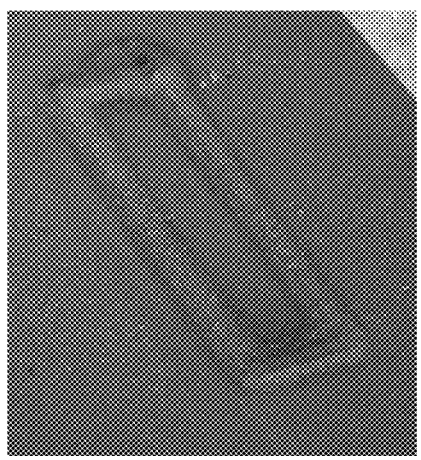
FIG. 21a is a photomicrograph of a substrate treated with a spray of the prior art.
Figure 21B:
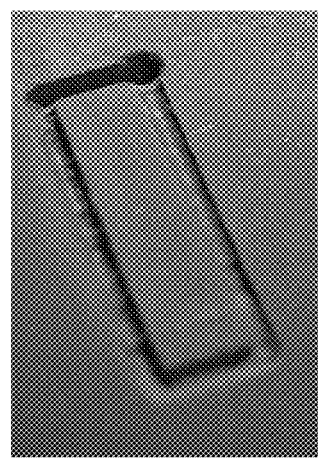
FIG. 21b is a photomicrograph of a substrate treated with a selected cryogenic spray composition of the present invention.
Figure 22A:
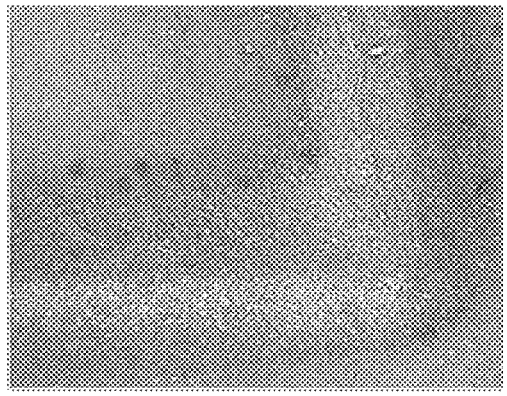
FIG. 22a is a photomicrograph of a substrate treated with a spray of the prior art.
Figure 22B:
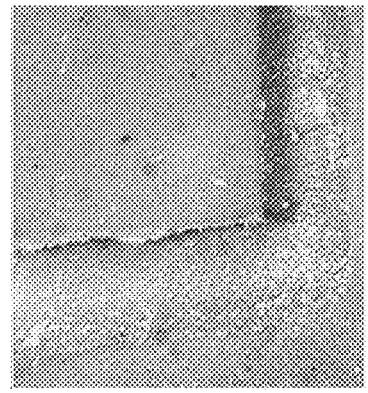
FIG. 22b is a photomicrograph of a substrate treated with a selected cryogenic spray composition of the present invention.

FIG. 21a depicts the substrate treated with the first spray of the prior art, while the FIG. 21b depicts the substrate treated with the second spray of the present invention. The results demonstrate that Laser milling with a spray composition of the present invention as compared to gas-assist Laser milling produces a cleaner channel and minimal sidewall melting, shown below. Also, the profile of the gas-assist experiment in FIG. 21a depicts minimal penetration and a plume which indicates overheating and non-uniform melting of the surface. By contrast, the Laser plunge profile of the composite spray test gives excellent circular uniformity, approximately equal to the Laser beam diameter, and much greater penetration depth. Referring to FIGS. 22a and 22b, magnification reveals significant differences in kerf width, channel depth, and relative smoothness. A closer examination under magnification reveals significant differences in kerf width, channel depth, and relative smoothness.

It was observed during the Laser machining of the fluorosilicone substrate that the gas assist spray was unable to extinguish a visible burning at the cutting zone during the Laser milling operation. The surface of the substrate was visibly charred following milling and required spray cleaning prior to taking the photomicrographs to reveal the machined surfaces. By contrast, the composite spray test resulted in a very clean and invisible IR Lasing operation, which suggests a much improved pyrolytic ablation.

An inherent advantage of the present invention was discovered to be the absence of significant soot generation and build-up on the Laser optics, which is detrimental to the Laser operation and attenuates Laser light energy reaching surface.

High Speed Spindle Milling of Acrylic Plastic

A machining test was performed to examine the surface quality of an acrylic plastic milled using a high speed robotic spindle operating at 40,000 rpm. A 0.64 cm (0.25 inch) substrate of acrylic plastic was milled using an Air Turbine Spindle Model 600. An automated rectangular scan pattern was performed using a Janome Cartesian Robot, Model No. JR2203. Robot scan speed was set to 10 mm/sec with a plunge depth of less than 0.5 mm using a ⅛ inch router bit. The spindle speed was not adjustable and was operated at 40,000 rpm. A rectangular pattern of approximately 1 cm×1 cm was milled into each sample surface for each type of spray tested.

A spray composition was derived comprising solid carbon dioxide as the coolant, compressed air as the diluent and no additive phase at a Fc:Fd:Fa ratio of approximately 20:80:0, and applied at a diluent pressure of 550 kPa (80 psi) and temperature of 373 K (212 degrees F.), producing a composite spray temperature of approximately 244 K (−20 degrees F.).

Figure 23:
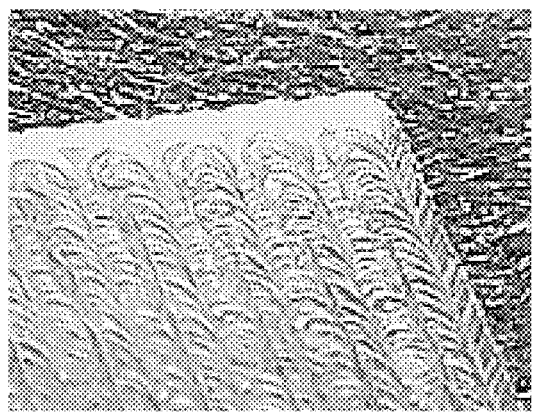
FIG. 23 is a photomicrograph of a substrate treated with a selected cryogenic spray composition of the present invention.

The results demonstrate that spindle milling with a spray composition of the present invention produces a clean channel and minimal surface chipping, as depicted in FIG. 23.

The present invention has been developed to address the cooling and lubricating challenges of high technology manufacturing operations such as high and low speed metalworking, micro-device machining, copper wafer dicing, and LASER drilling. However, the present invention is not limited in use or application to a specific market or application. For example the present invention can be used to selectively solidify freeze biological tissues such as tumors or warts, a means for relieving pain due to burns, and a method for removing skin blemishes through a cryokinetic removal processes, and a means for directional solidification. The present invention provides a unique and very useful hybrid technology, providing cooling, lubricating and cleaner processing for integration into original equipment manufacturer (OEM) tools as well as serving as a stand-alone tool for manufacturing companies requiring this combination of dry and semi-dry thermal control, cooling and/or lubrication.

Although the present invention has been described with reference to preferred embodiments, workers skilled in the art will recognize that changes may be made in form and detail without departing from the spirit and scope of the invention.

The invention claimed is:

1. A method of forming a composite fluid for treating a surface during a machining process, the method comprising:
providing a first stream containing carbon dioxide;
providing a stepped capillary condenser for at least partially solidifying the carbon dioxide, wherein the stepped capillary condenser comprises a first flexible capillary segment connected to a second flexible capillary segment, the second capillary segment having a greater inner diameter than the first capillary segment;
at least partially solidifying the carbon dioxide contained in the first stream, wherein the first stream enters the first capillary segment and progresses toward the second segment, whereupon entering the second segment, at least a portion of the carbon dioxide condenses into solid particles;
providing a second stream containing inert gas at a temperature between 305 K to about 477 K; and
combining the first stream and the second stream to form the composite fluid.

2. The method of claim 1 wherein the inert gas comprises nitrogen, argon, clean dry air, compressed air or carbon dioxide.

3. The method of claim 1 and further comprising providing a third stream containing an additive to physicochemically modify the first stream, the second stream or both to enhance the lubricity or cooling properties of the composite fluid.

4. The method of claim 3 wherein the additive is admixed into the first stream before at least partially solidifying the carbon dioxide.

5. The method of claim 3 wherein the additive comprises rapeseed oil, ethyl lactate, a soy methyl ester, a petroleum oil, a biological based oil, a ketone, a polyglycol, a phosphate ester, a phosphateether, a synthetic hydrocarbon, diethylene glycol monobutyl ether, a silicone, chlorinated paraffinic oil, PolyTetraFluroEthylene, boron nitride, a pour point additive, a detergent, a foam inhibitor, hydrogen peroxide, percarbonic acid, water, acetone, methyl ethyl ketone, carbon dioxide, HydroFluoroCarbon 134a or butane.

6. A method of forming a cryogenic composite fluid for treating a surface of a substrate during a machining process, the method of forming the cryogenic composite fluid comprising:
providing a stepped capillary condenser, the stepped capillary condenser comprising a first flexible capillary segment attached to a second flexible capillary segment, the second capillary segment having a greater inner diameter than the first capillary segment, wherein liquid carbon dioxide entering the first capillary segment progresses toward the second segment, whereupon entering the second segment, at least a portion of the liquid carbon dioxide condenses into solid carbon dioxide particles;
supplying the capillary condenser with liquid carbon dioxide to form a sublimable coolant containing solid carbon dioxide particles;
providing a diluent derived from an inert gas; and
intimately combining the coolant and the diluent prior to contacting the surface of the substrate, wherein the resultant cryogenic composite fluid exhibits synergistically enhanced physicochemical properties to impart cooling, heating, or lubrication effects to the substrate when applied to the substrate surface during the machining process.

7. The method of claim 6 wherein the diluent is provided at a temperature range from 305 K to about 477 K prior to being combined with the sublimable coolant.

8. The method of claim 6 wherein the diluent derived from the inert gas excludes carbon dioxide.

9. The method of claim 6 wherein the coolant and the diluent are combined within a nozzle.

10. The method of claim 6 and further comprising providing an additive to provide lubricity or to physicochemically modify the coolant or the diluent to enhance cooling, heating or lubrication effects of either the coolant or the diluent.

11. The method of claim 10 wherein the additive comprises an organic liquid or an organic gas.

12. A method of forming a machining spray for treating a surface of a substrate during a machining process, the method comprising:
providing a first component containing solid carbon dioxide particles formed within a stepped capillary condenser, the stepped capillary condenser comprising a first flexible capillary segment attached to a second flexible capillary segment, the second capillary segment having a greater inner diameter than the first capillary segment, wherein liquid carbon dioxide entering the first capillary segment progresses toward the second capillary segment, whereupon entering the second segment, at least a portion of the liquid carbon dioxide condenses into solid carbon dioxide particles;
providing a second component derived from an inert gas, the inert gas having a temperature range from 305 K to about 477 K prior to being mixed with the solid carbon dioxide particles; and
combining the first component and the second component prior to contacting the substrate, the resultant machining spray exhibiting synergistically enhanced physicochemical properties of each component not observed prior to the combination thereof, wherein the machining spray imparts enhanced cooling, heating or lubrication effects.

13. The method of forming the machining spray of claim 12 wherein the inert gas comprises nitrogen, argon, clean dry air or compressed air.

14. The method of claim 12 and further comprising:

providing a third component derived from an additive; and combining the additive with the first component and the second component prior to contacting the substrate to provide lubricity or to physicochemically modify the first component or the second component to enhance cooling, heating or lubrication effects of either the first component, the second component or both.

15. The method of forming the machining spray of claim 14 wherein the additive comprises an organic liquid or an organic gas.

16. The method of claim 1 wherein the first flexible capillary segment terminates at the connection to the second flexible capillary segment.

17. The method of claim 6 wherein the first flexible capillary segment terminates at the attachment to the second flexible capillary segment.

18. The method of claim 12 wherein the first flexible capillary segment terminates at the attachment to the second flexible capillary segment.

* * * * *